United States Patent [19]

Kobiella

[11] Patent Number: 4,479,834
[45] Date of Patent: Oct. 30, 1984

[54] ARTICLE STRAPPING METHOD AND APPARATUS

[75] Inventor: Robert J. Kobiella, Rolling Meadows, Ill.

[73] Assignee: Signode Corporation, Chicago, Ill.

[21] Appl. No.: 442,524

[22] Filed: Nov. 19, 1982

[51] Int. Cl.$^3$ .................................... B29C 27/08
[52] U.S. Cl. .......................... 156/73.5; 100/33 PB; 156/157; 156/494; 156/502; 156/580
[58] Field of Search .................. 156/73.5, 502, 580, 156/157, 212, 494; 100/33 PB

[56] References Cited

U.S. PATENT DOCUMENTS

| | | | |
|---|---|---|---|
| 779,253 | 1/1905 | Bayliss | 474/201 |
| 801,451 | 10/1905 | Fouillaron | 474/201 |
| 893,787 | 7/1908 | Conklin | 474/242 |
| 1,983,473 | 12/1934 | Leaver | 100/7 |
| 2,195,043 | 3/1940 | Wright | 100/26 |
| 2,309,648 | 2/1943 | Kelly | 474/242 |
| 2,403,607 | 7/1946 | Ogard | 474/242 |
| 2,475,264 | 7/1949 | Sutton | 474/245 |
| 2,638,963 | 5/1953 | Frederick et al. | 219/10.53 |
| 2,663,194 | 12/1953 | Ogard | 474/242 |
| 2,687,083 | 8/1954 | Cranston | 100/28 |
| 3,075,862 | 1/1963 | Hoyer | 428/130 |
| 3,179,335 | 4/1965 | MacKenzie | 100/26 |
| 3,184,354 | 5/1965 | Strother | 156/73.2 |
| 3,232,216 | 2/1966 | Cranston et al. | 100/28 |
| 3,269,300 | 8/1966 | Billet et al. | 100/8 |
| 3,418,196 | 12/1968 | Luc | 428/198 |
| 3,442,732 | 5/1969 | Stensaker et al. | 100/2 |
| 3,494,280 | 2/1970 | Kobiella | 100/2 |
| 3,548,740 | 12/1970 | Kobiella | 100/28 |
| 3,586,590 | 6/1971 | Brenneisen | 156/580.2 |
| 3,629,035 | 12/1971 | Kuroda | 156/219 |
| 3,636,861 | 1/1971 | Weller | 100/4 |
| 3,749,622 | 7/1973 | Yoshimasa et al. | 156/502 |
| 3,996,403 | 12/1976 | Gould et al. | 428/198 |
| 4,050,372 | 9/1977 | Kobiella | 156/73.5 |
| 4,305,774 | 12/1981 | Wedeking et al. | 156/580 |
| 4,393,763 | 7/1983 | Sauer | 156/502 |

FOREIGN PATENT DOCUMENTS 742723 1/1956 United Kingdom .
697048 11/1979 U.S.S.R. .

OTHER PUBLICATIONS

Safety, Service and Maintenance Manual for Signode Automatic Power Strapping Machine Models ML2-EE, ML2-JE, & ML2-HG (SPD 510 Rev. 6/80 3M-A).

Signode Model MLN-2A Power Strapping Machine Operation, Safety and Maintenance Manual (SPD 948 9/80-2M-CL).

Primary Examiner—Michael Wityshyn
Attorney, Agent, or Firm—Dressler, Goldsmith, Shore, Sutker & Milnamow, Ltd.

[57] ABSTRACT

A machine and method are disclosed for securing a loop of thermoplastic strap around an article so that two overlapping portions of strap are bonded together. One form of an apparatus in the machine has a strap engaging weld pad with spaced-apart, parallel strap-engaging ribs for effectively making a friction-fusion weld in thin film strap. Another form of the apparatus in the machine includes a rack gear associated with a weld pad and engaged with an arc of teeth on a torsion bar for utilizing the torsional oscillation kinetic energy to reciprocate the weld pad along a linear path of motion. Another form of the apparatus in the machine includes a strap carrier chain for forming the strap in a loop about an article and the chain may include a resilient lug positioned between each pair of adjacent cross pins in the chain. Another form of the apparatus in the machine includes (1) means for reciprocating an anvil between a retracted position and an extended position below an article, (2) grippers and cutters connected with a linkage system to move the grippers and cutters between a closed position against the anvil and open position away from the anvil, and (3) carriages for moving the cutters and grippers from a retracted position to an extended position independently of the anvil. All of the forms of the apparatus may be used separately and independently of each other in various other types of strapping machines.

23 Claims, 47 Drawing Figures

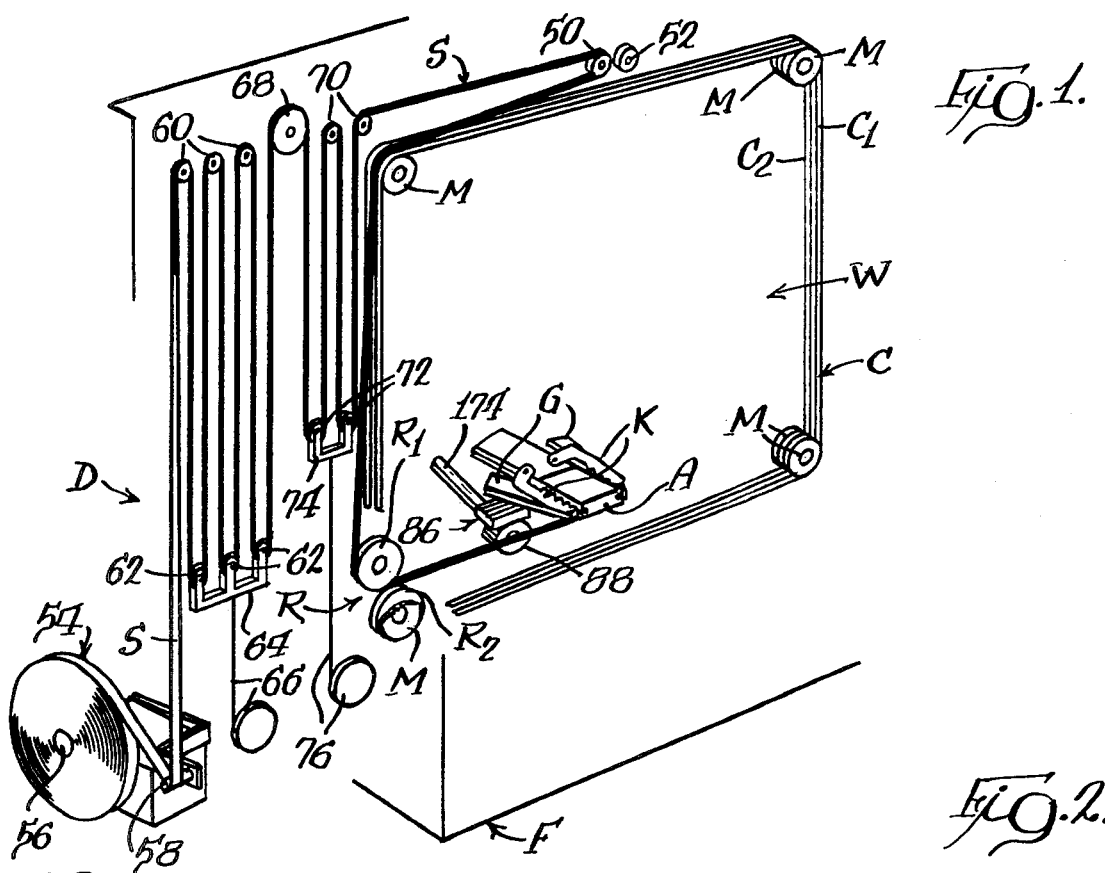
Fig. 1.
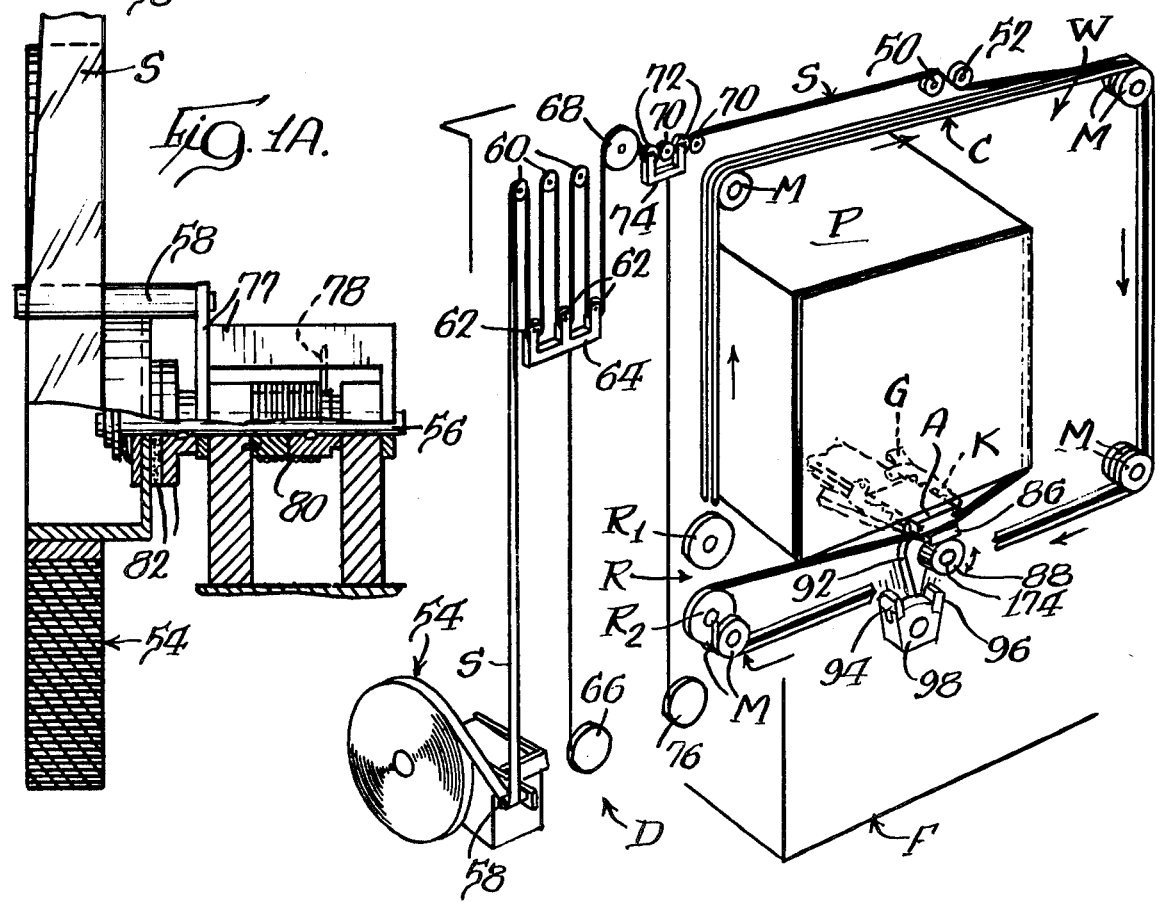
Fig. 1A.
Fig. 2.

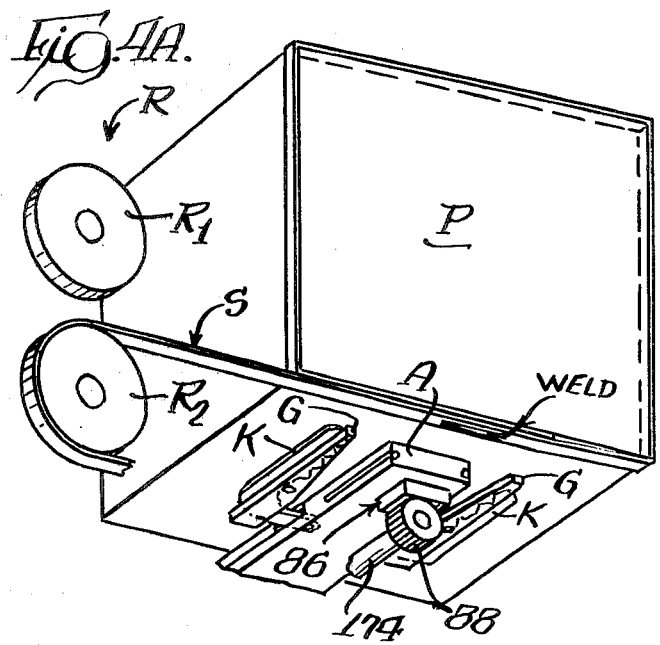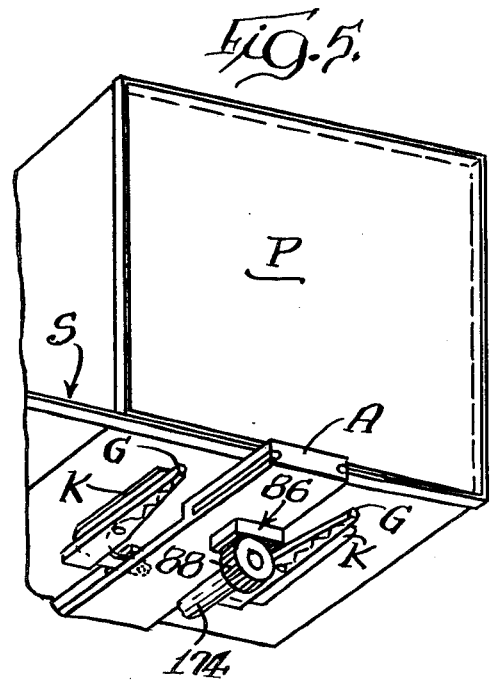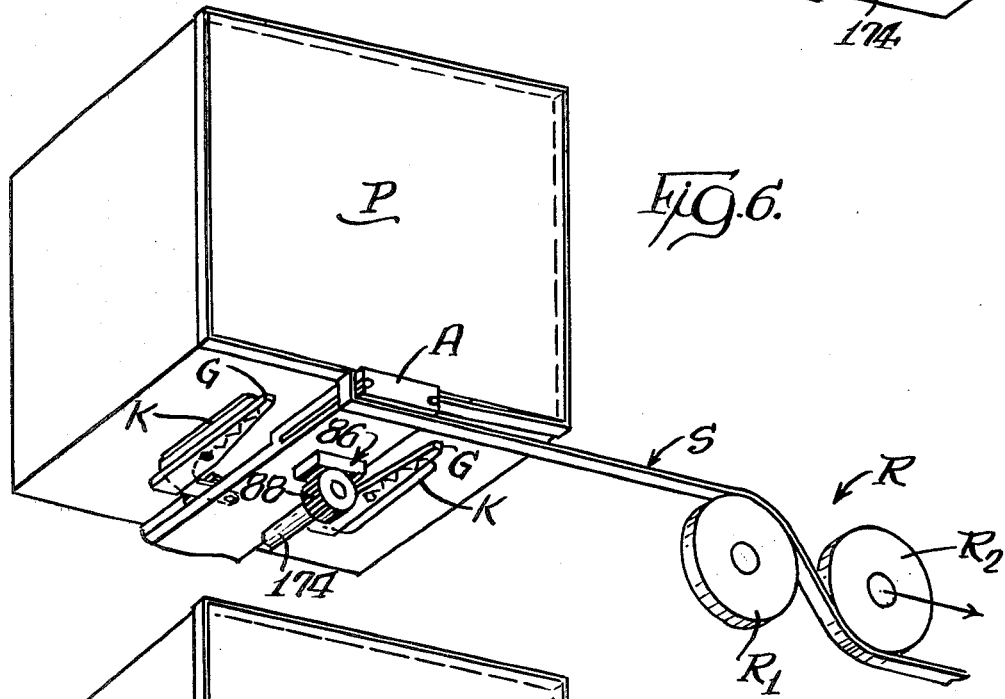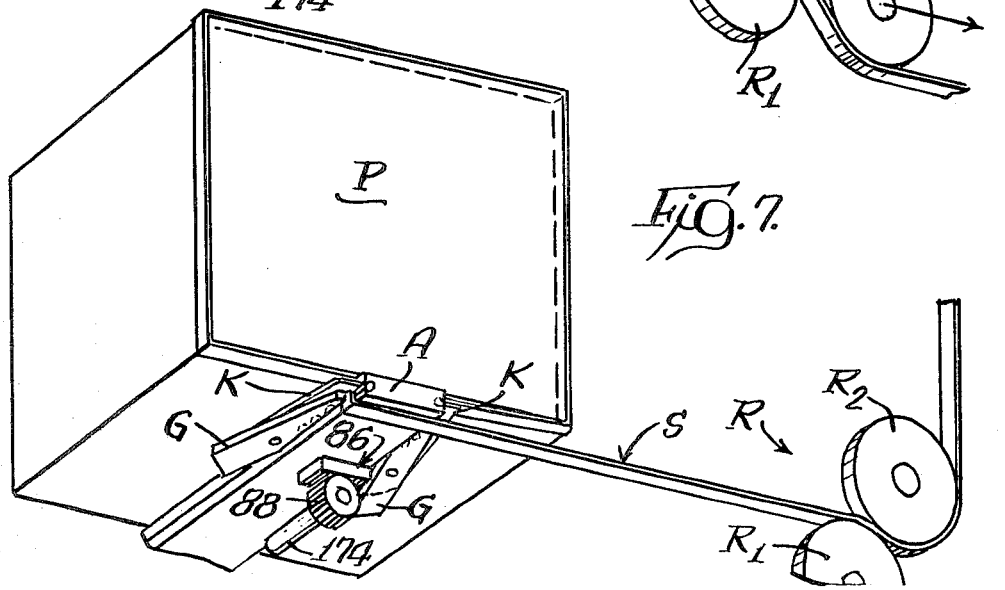

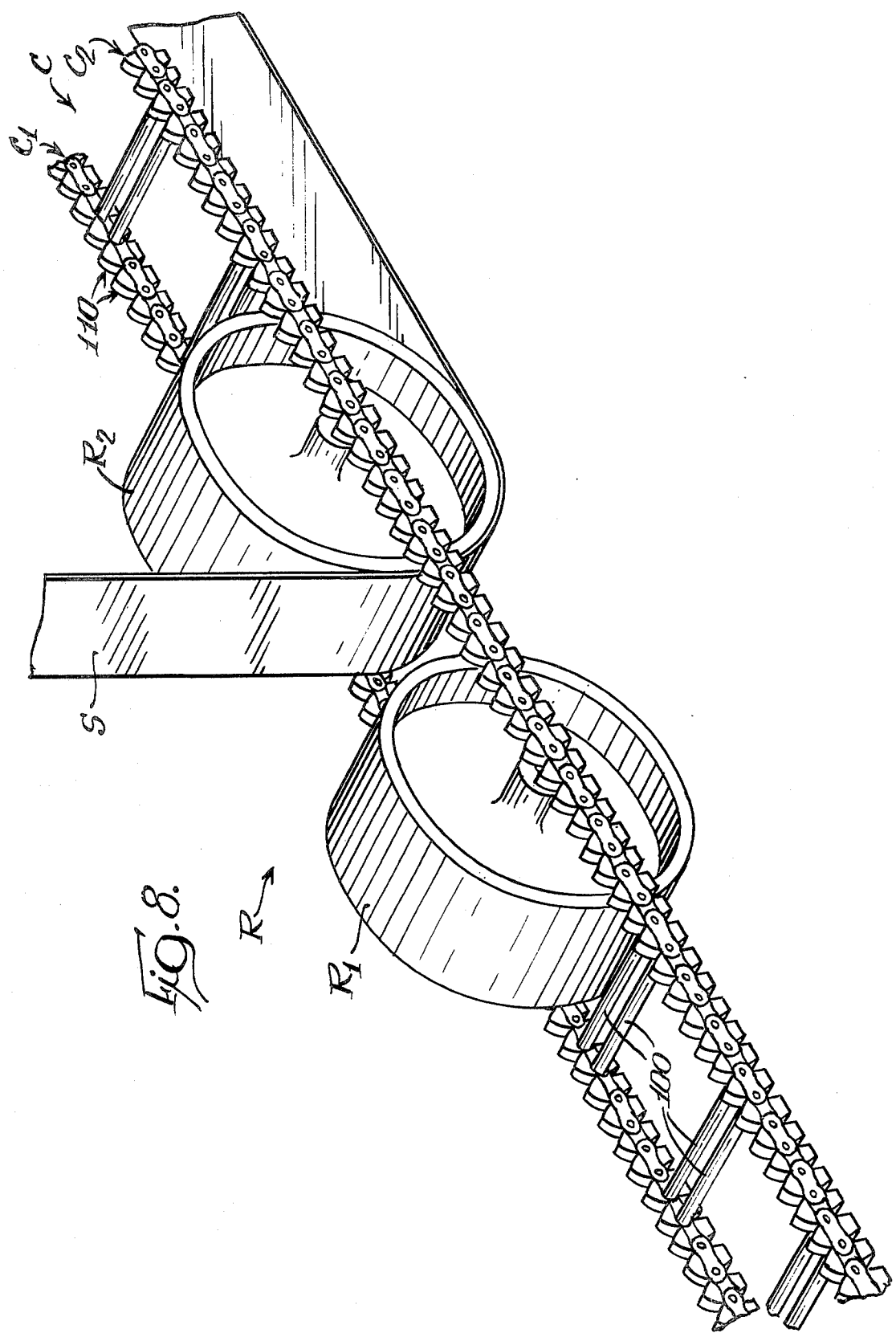

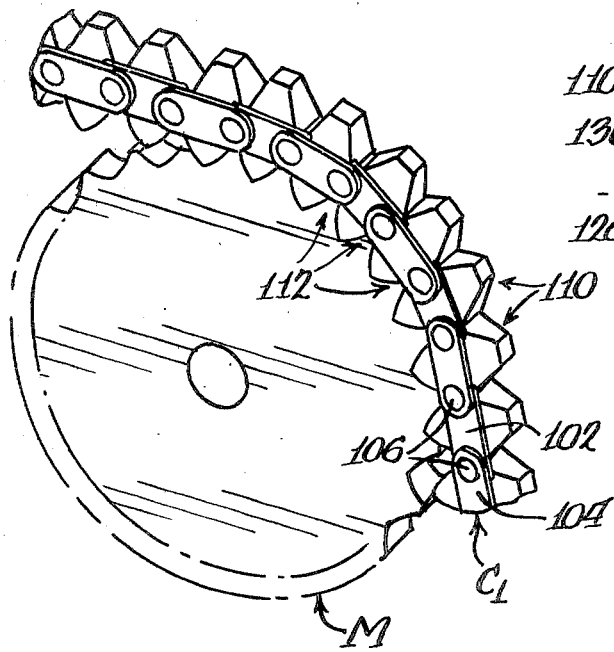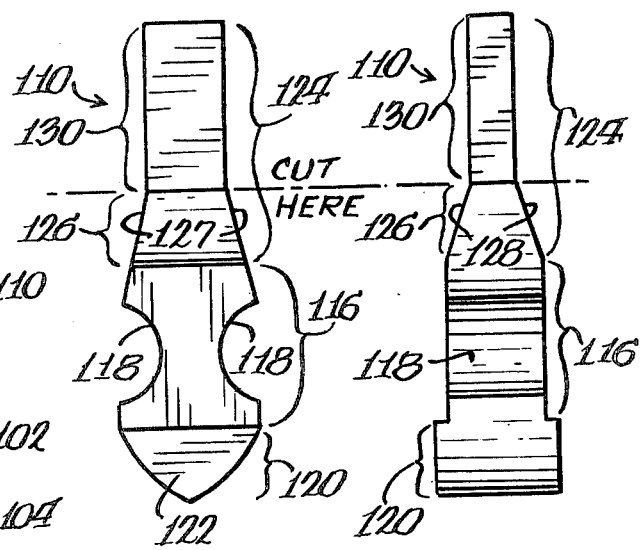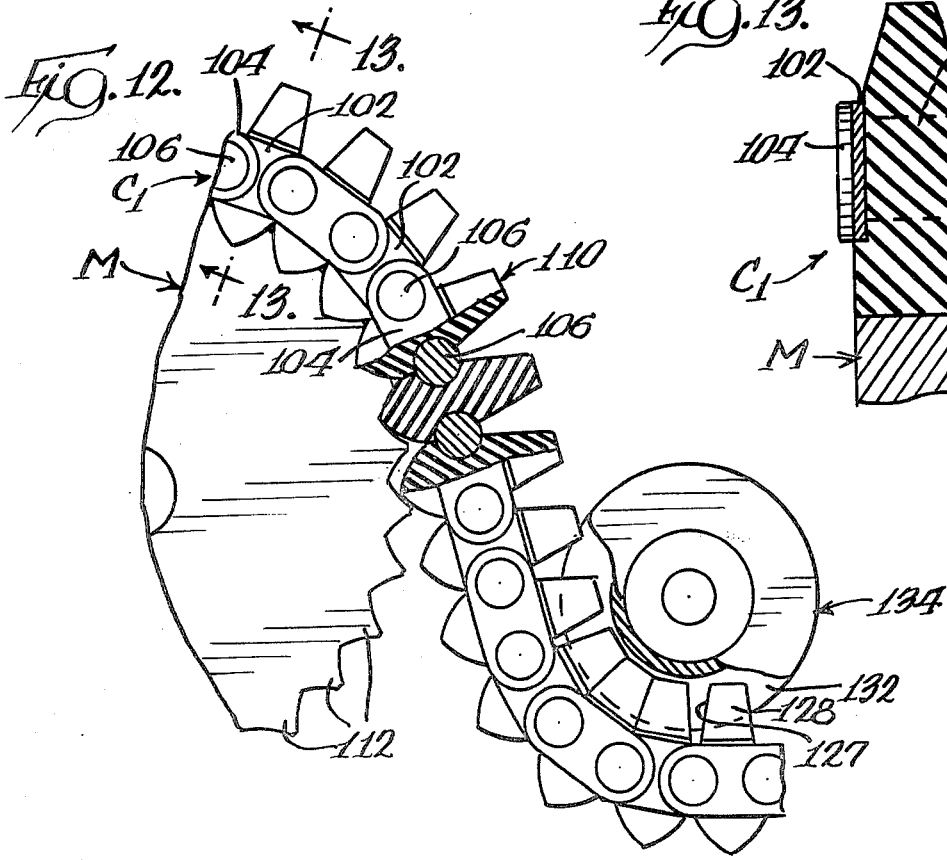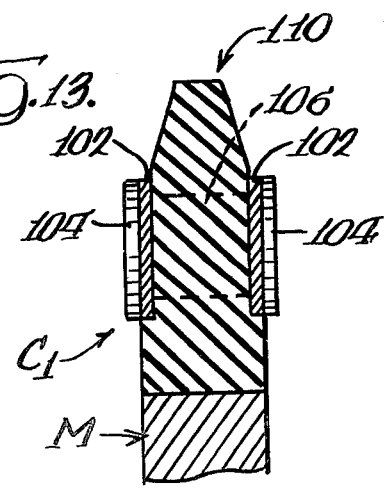

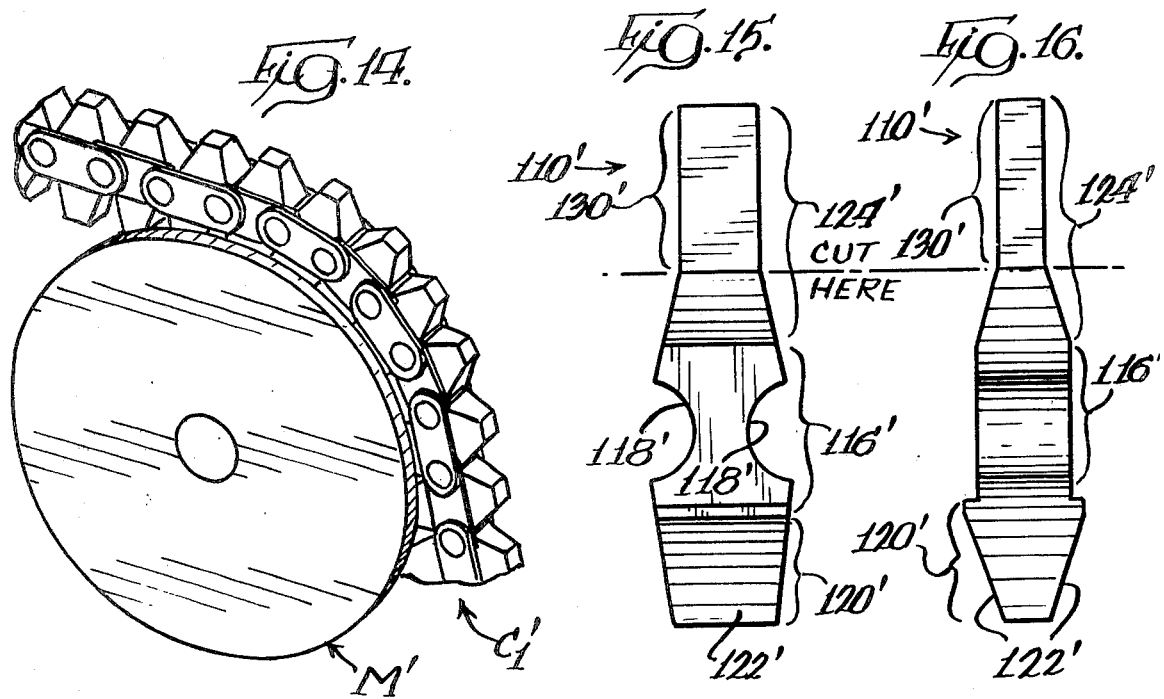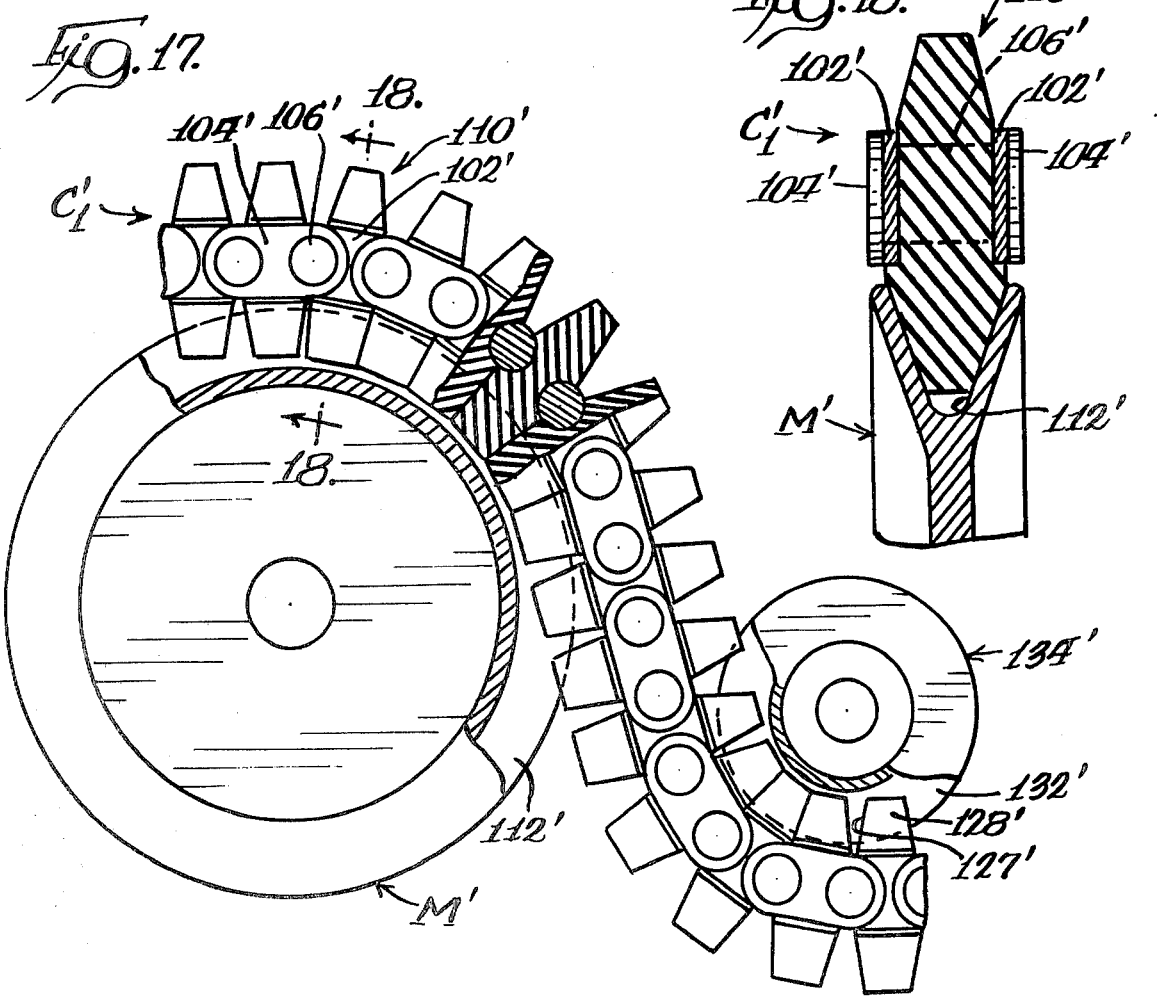

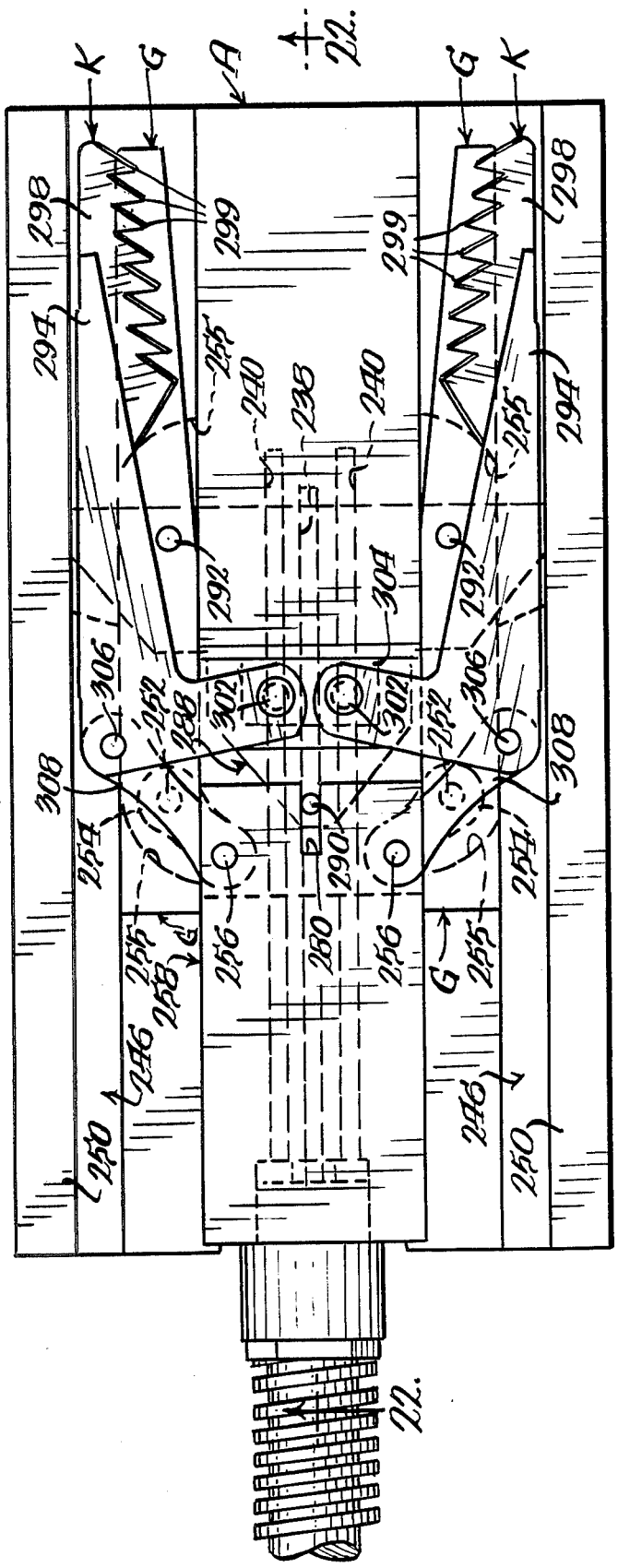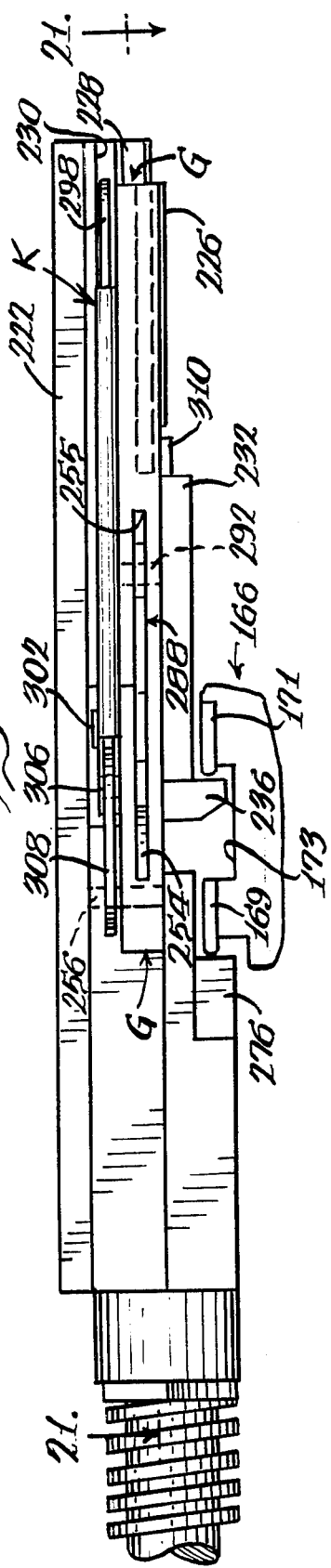

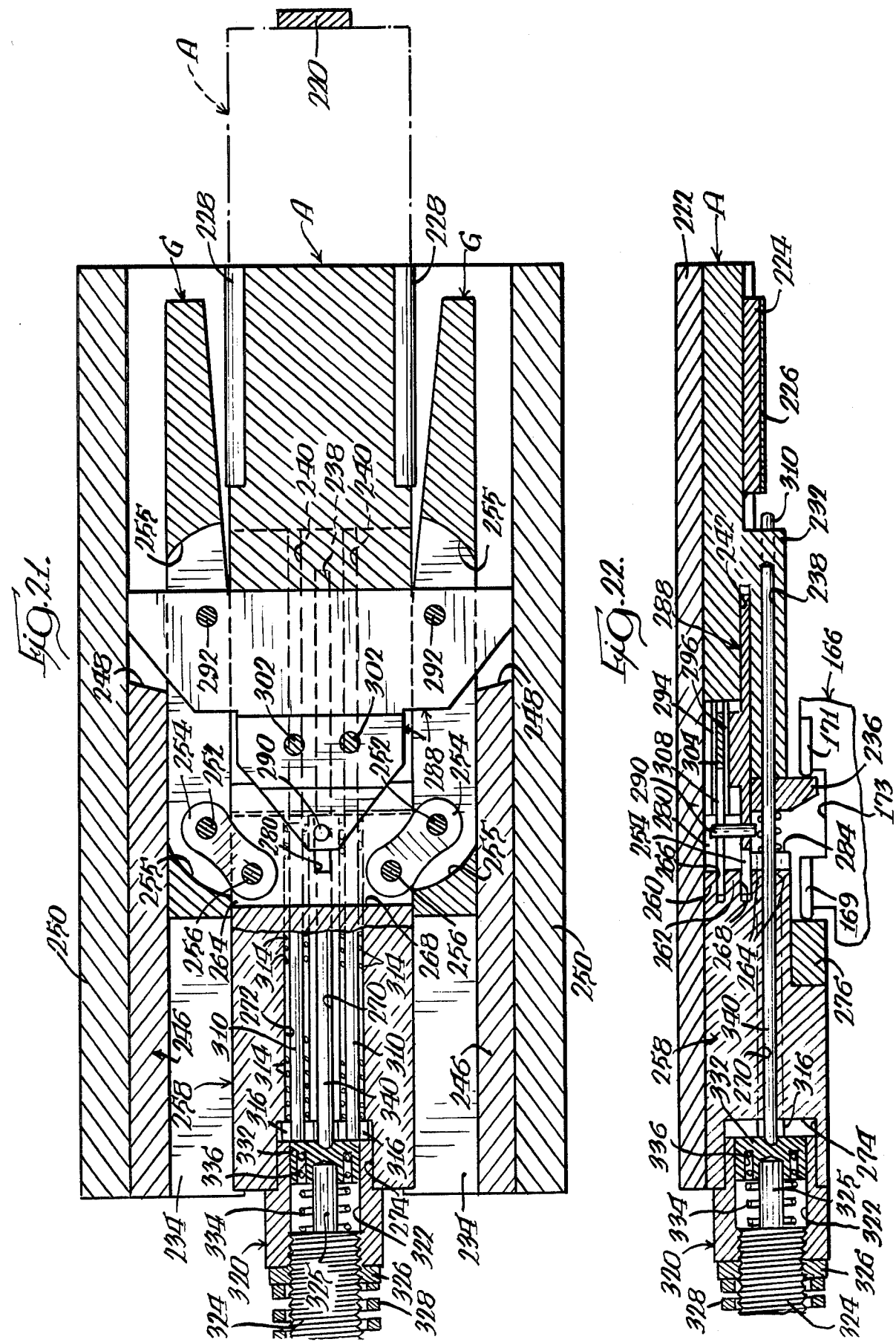

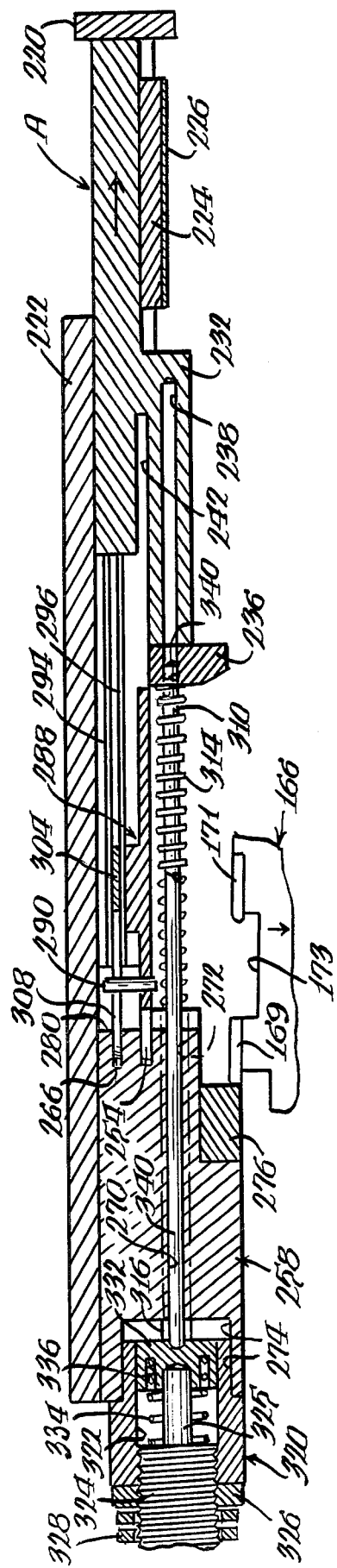
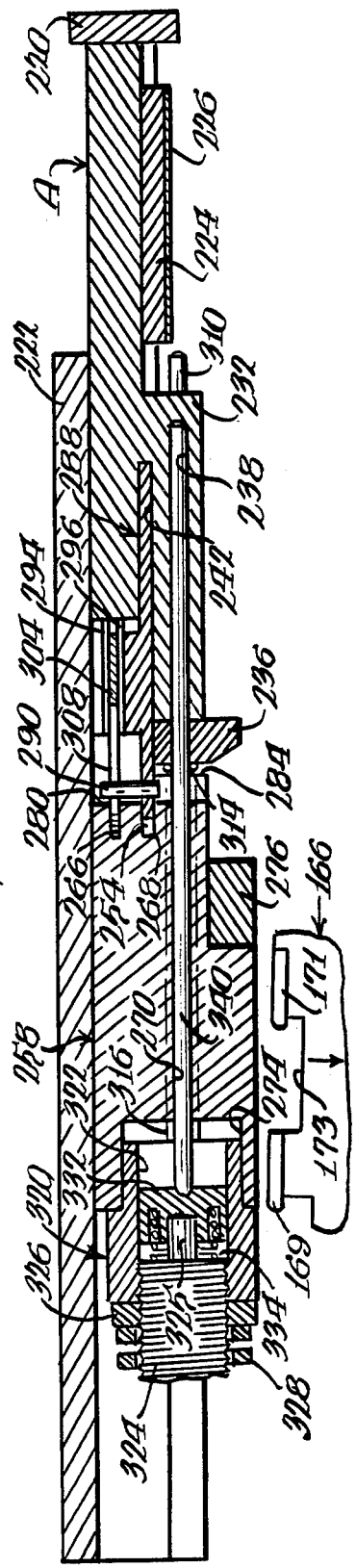

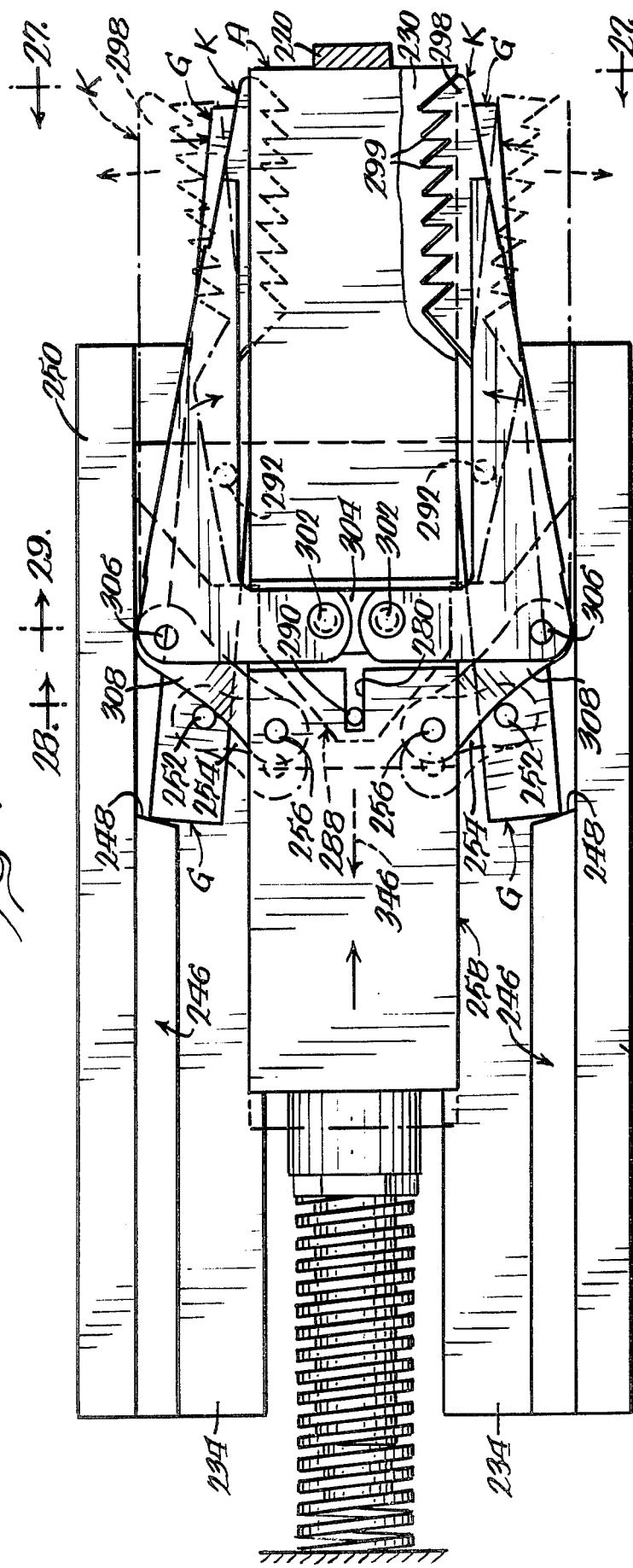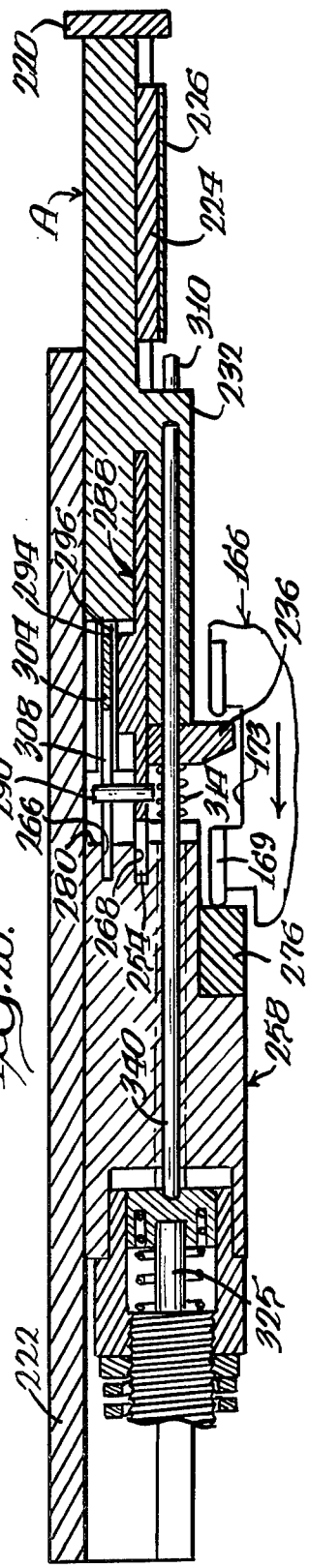

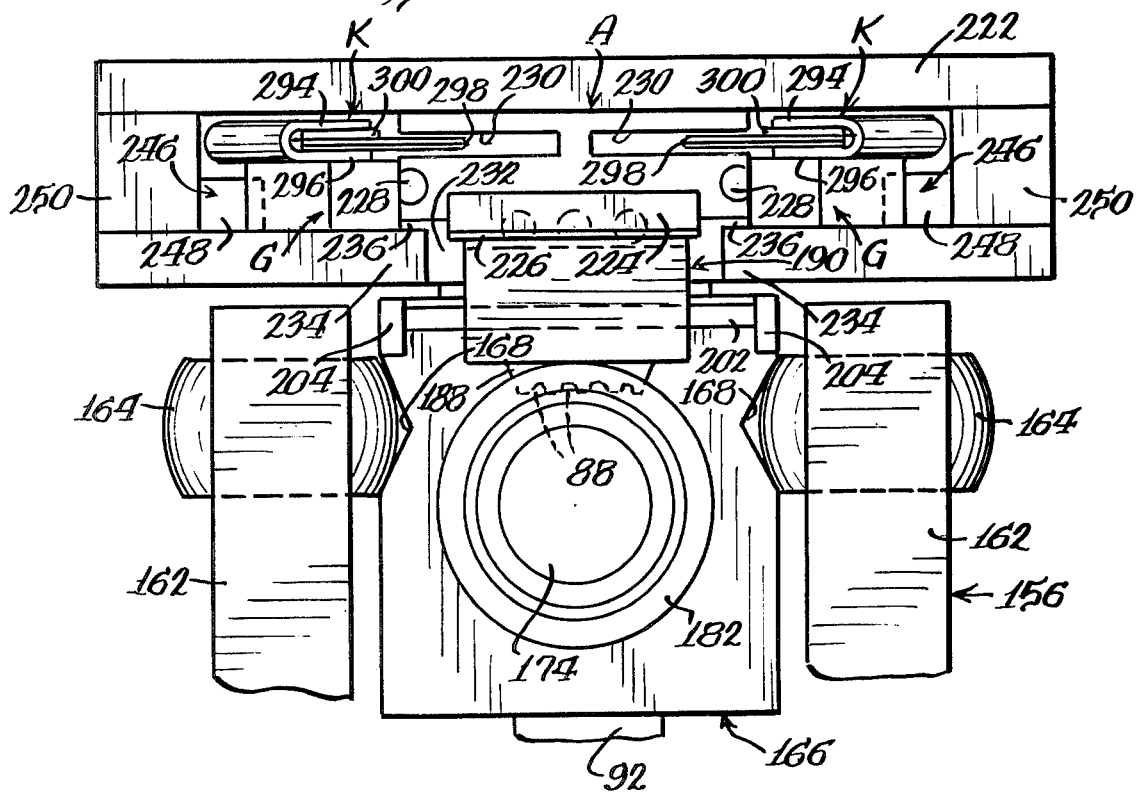
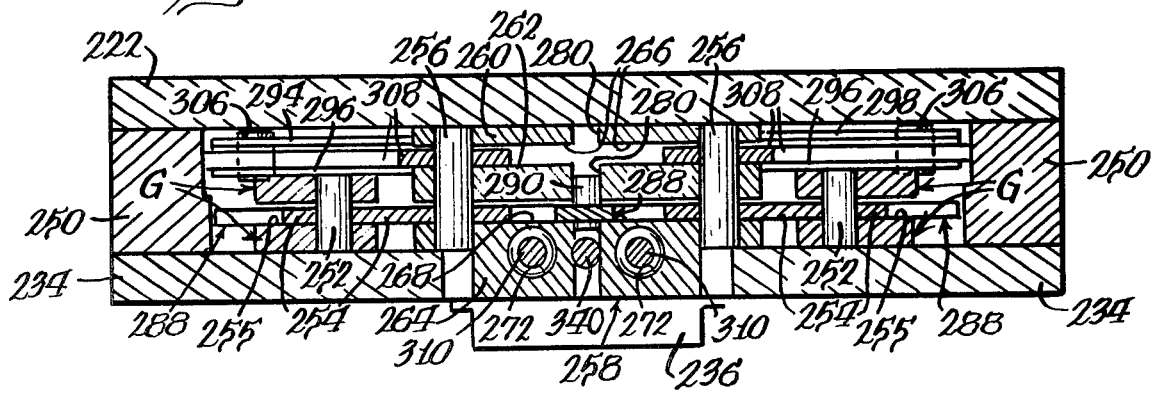
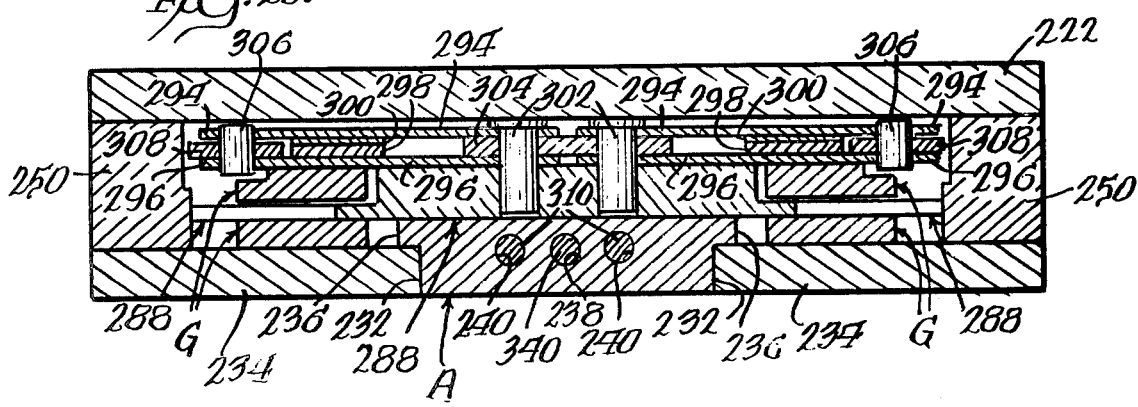

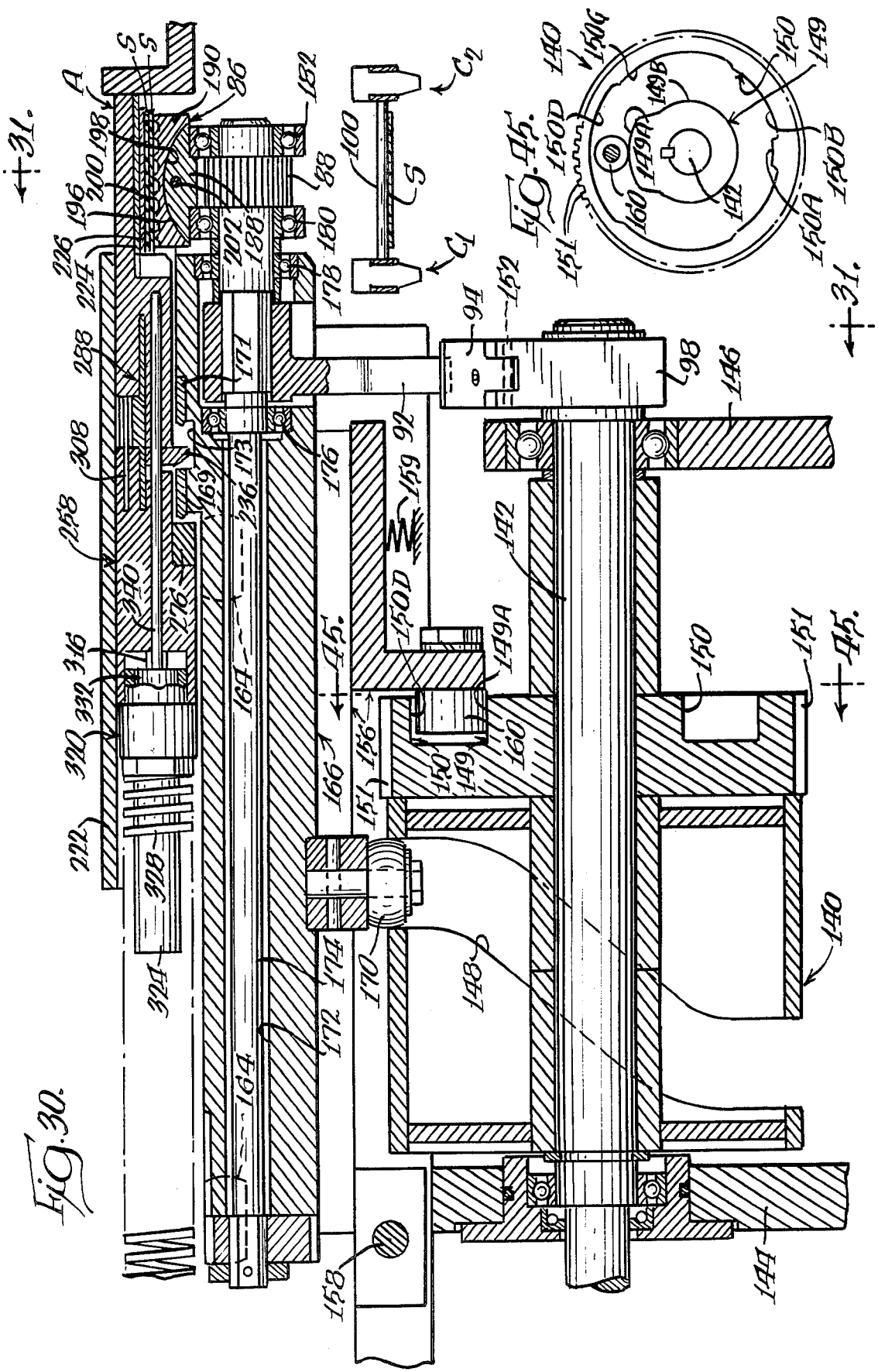

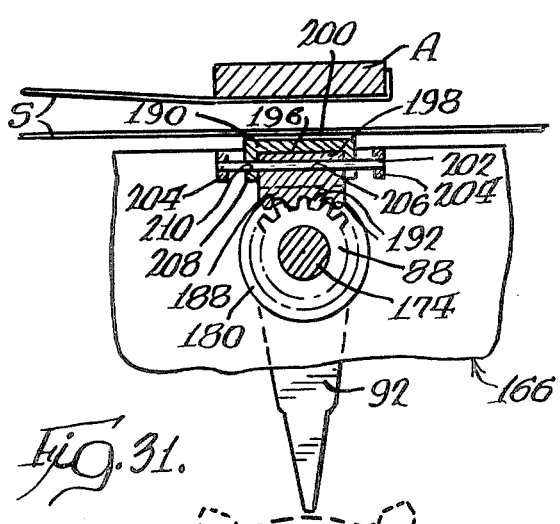
Fig. 31.
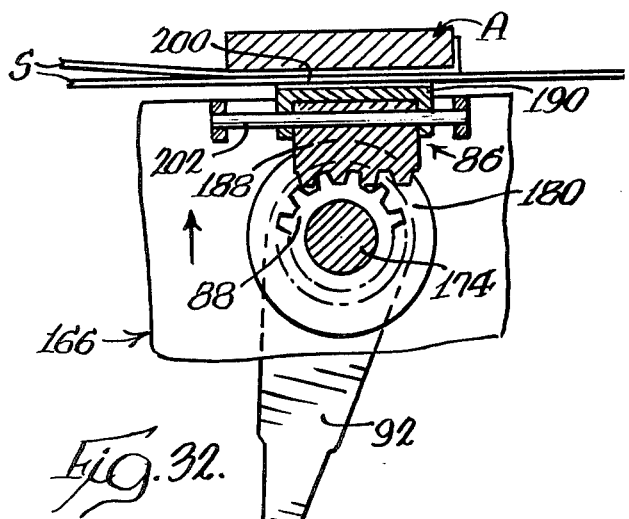
Fig. 32.
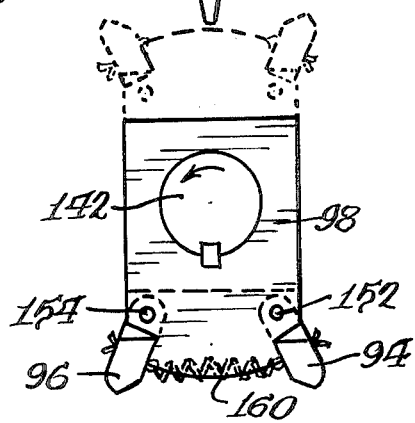
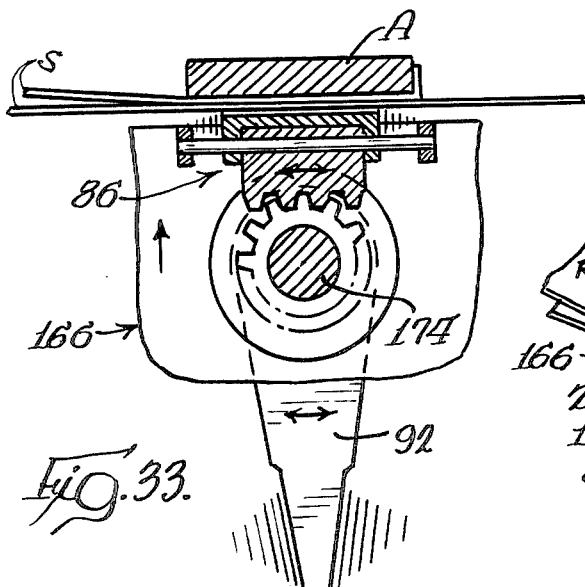
Fig. 33.
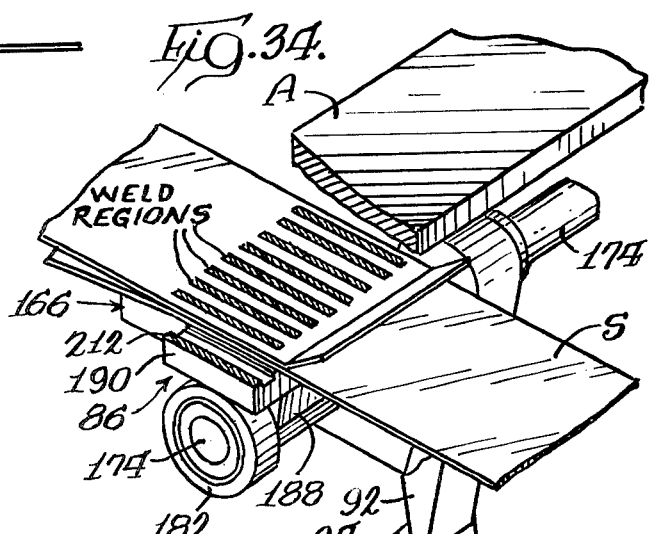
Fig. 34.
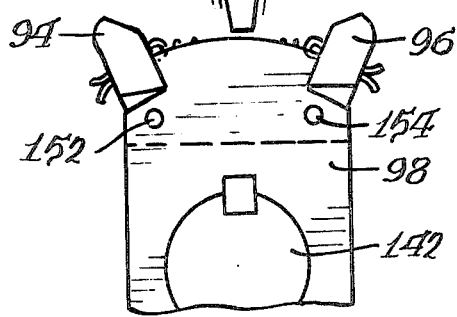
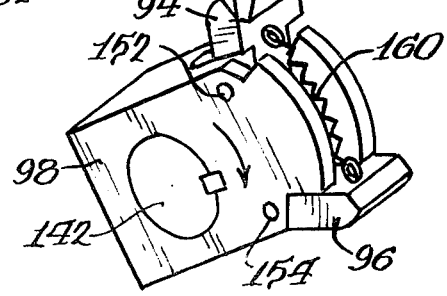

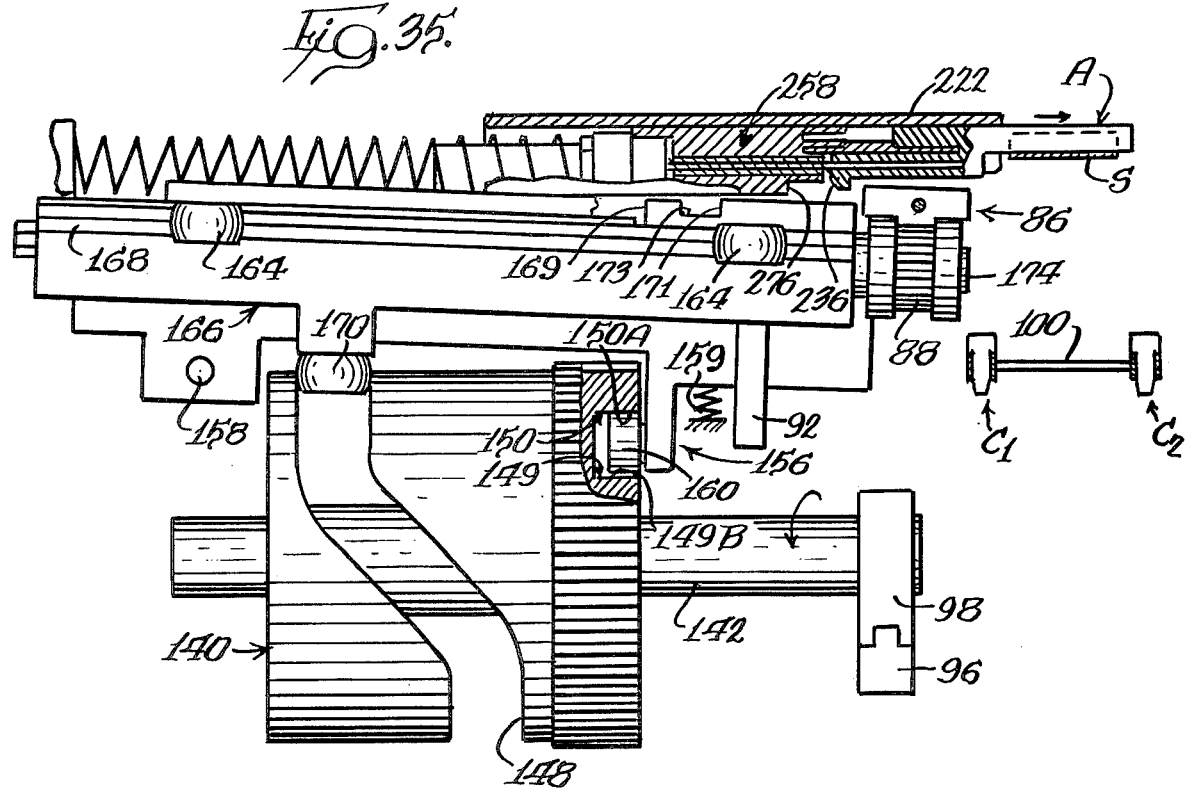
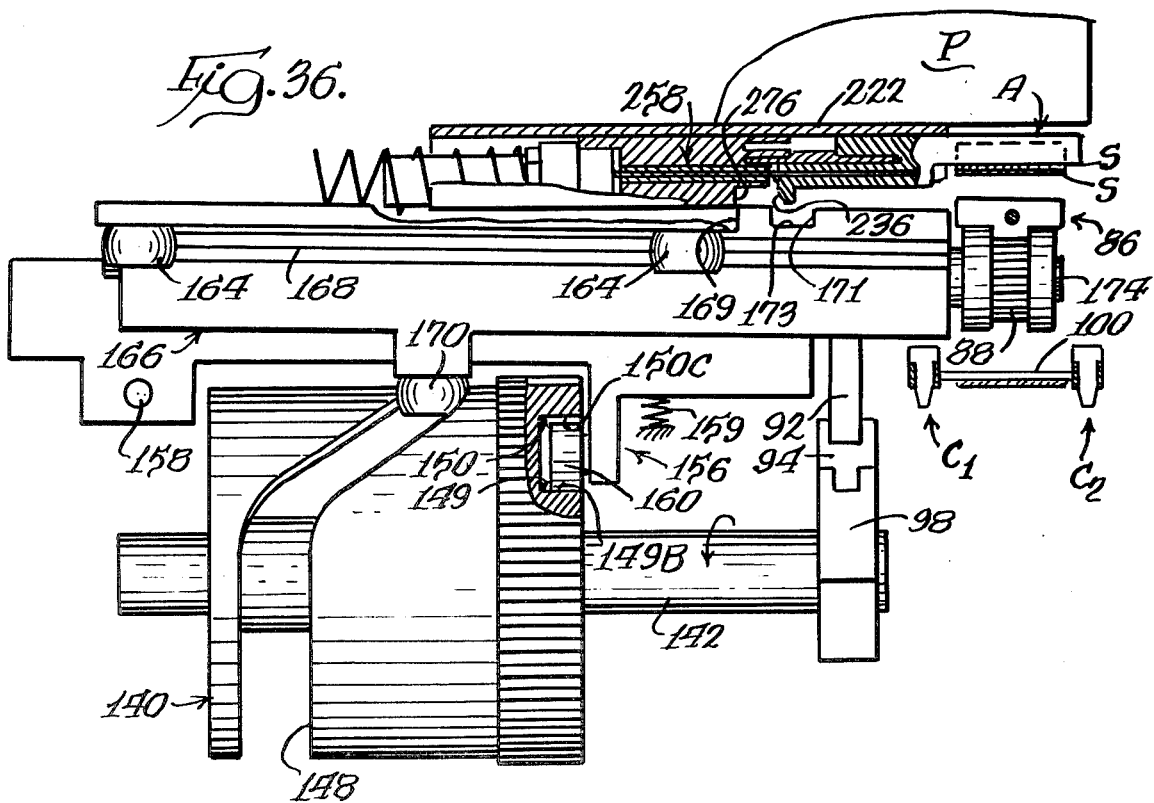

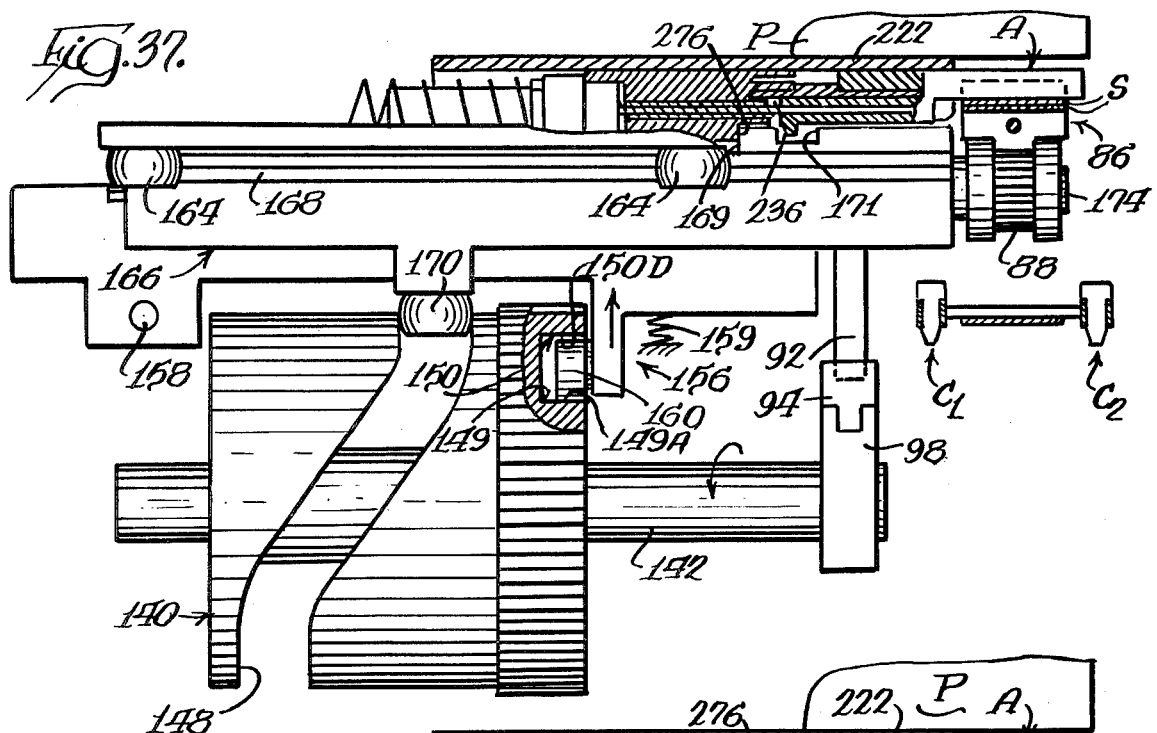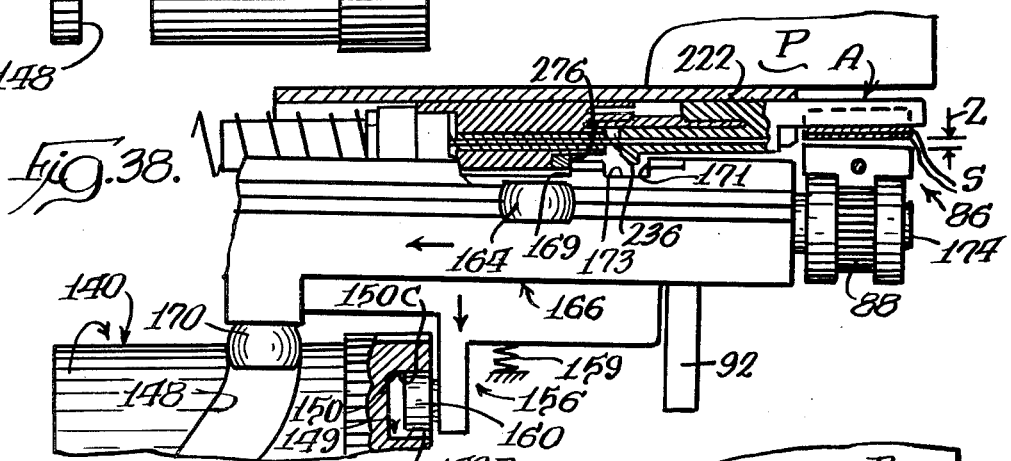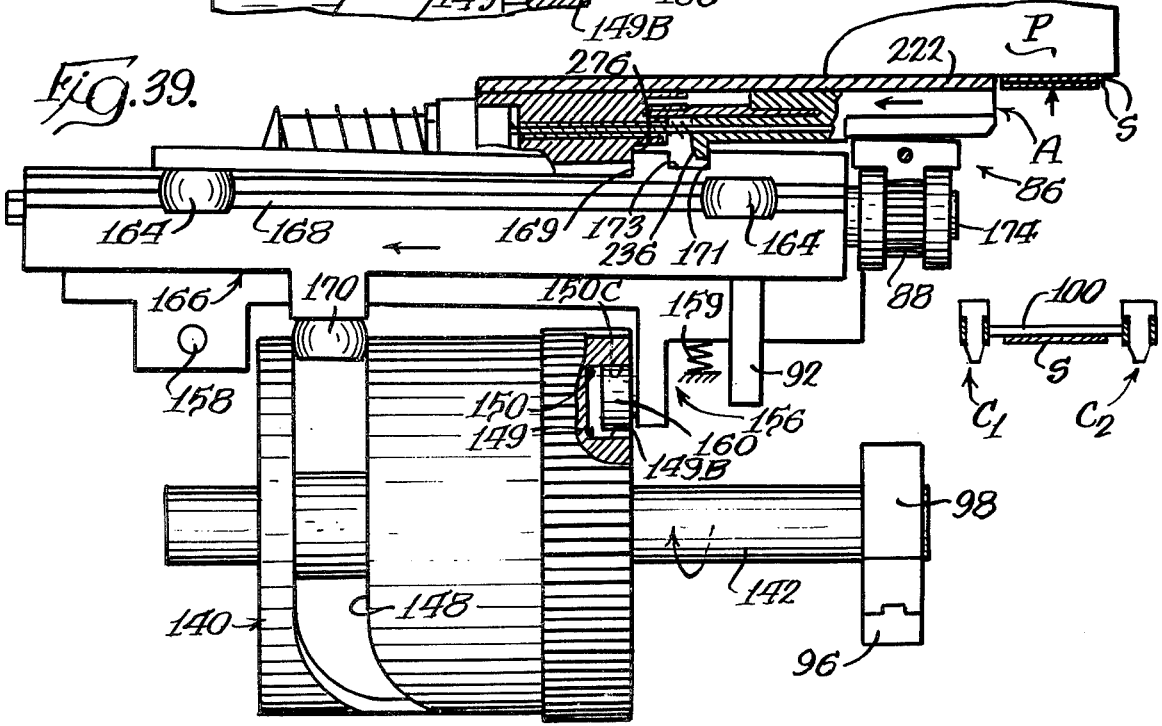

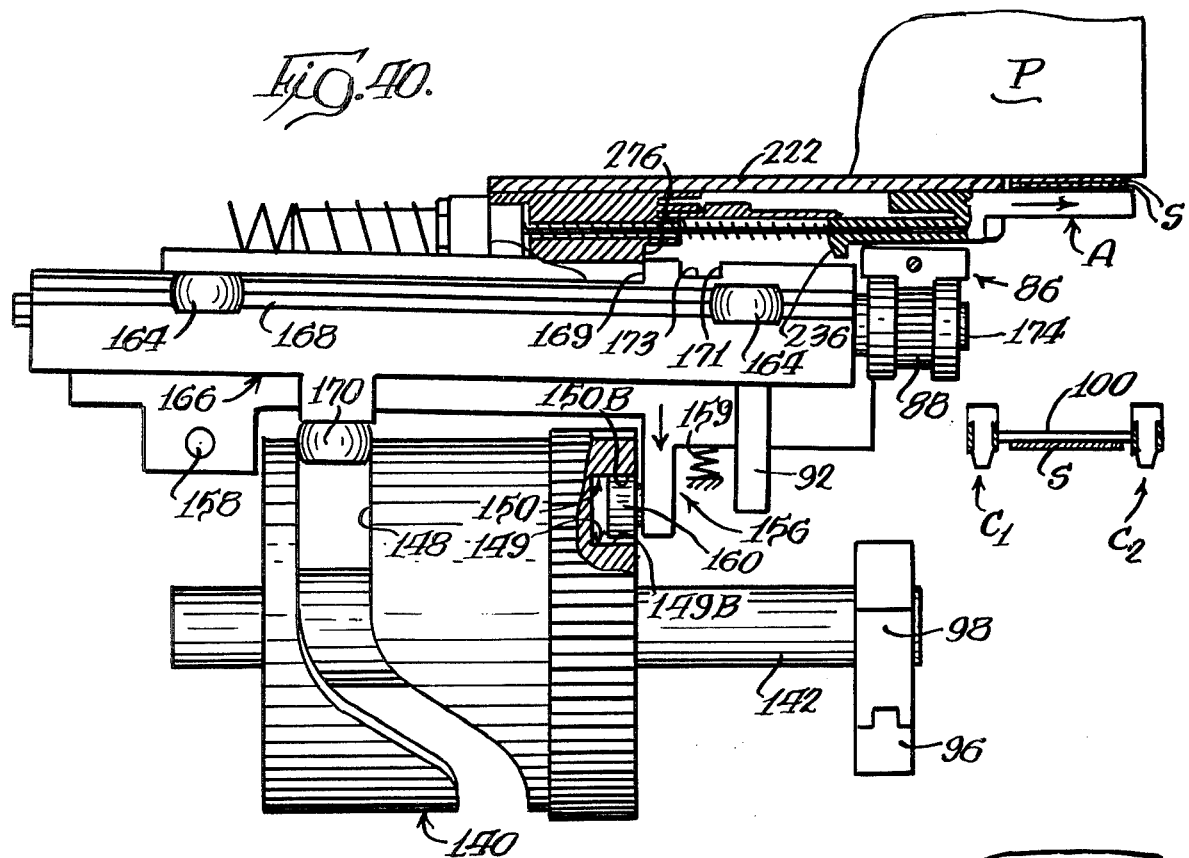
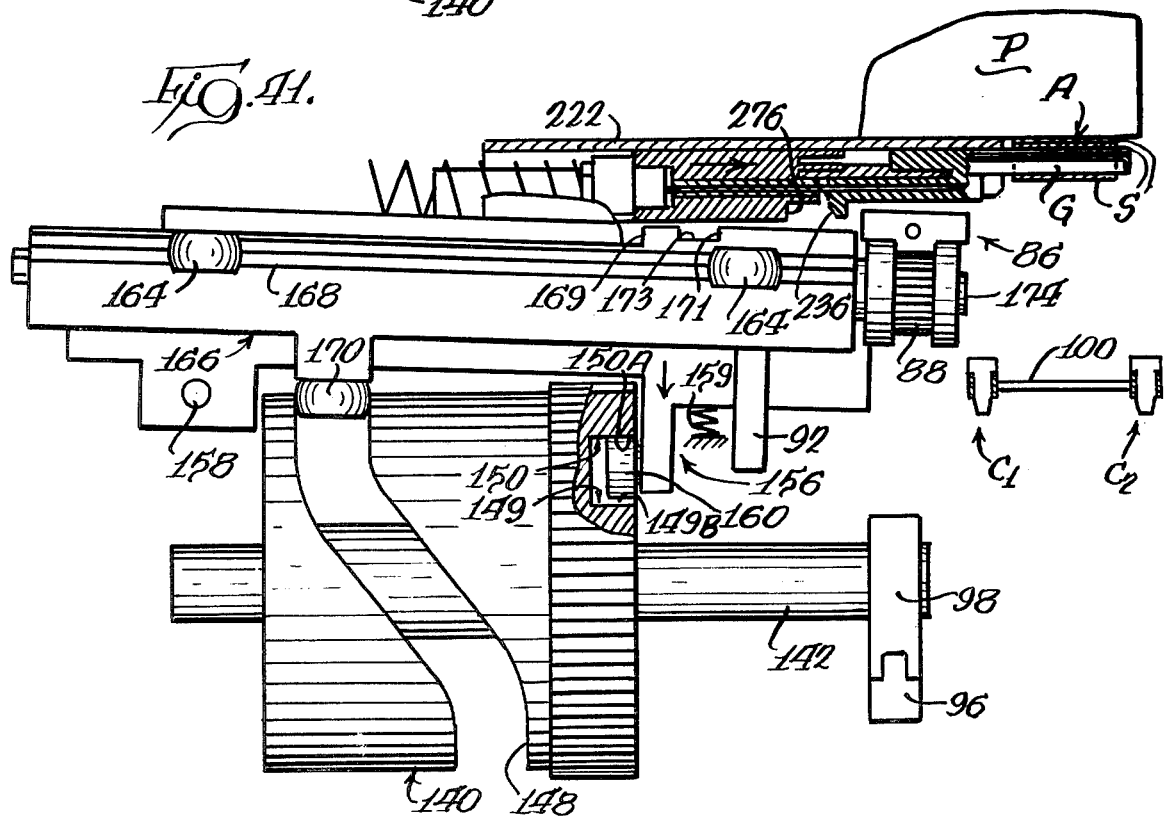

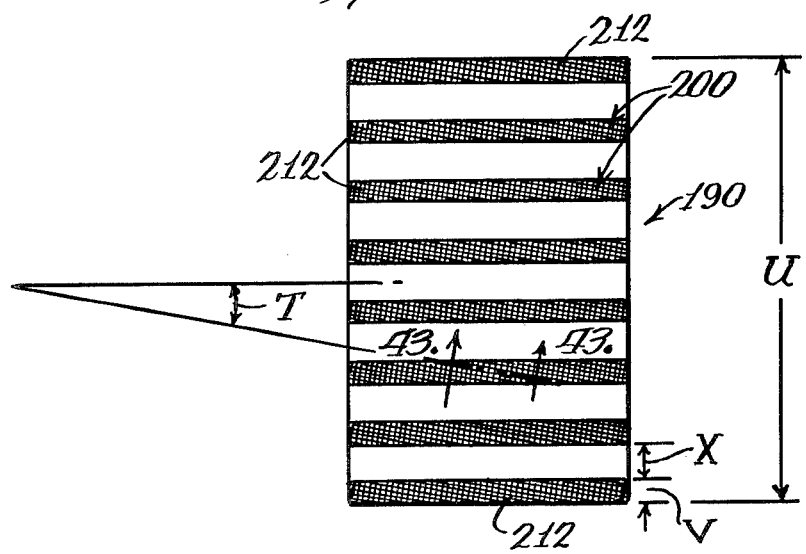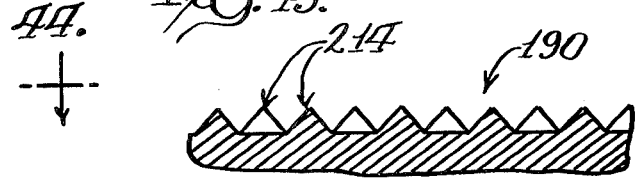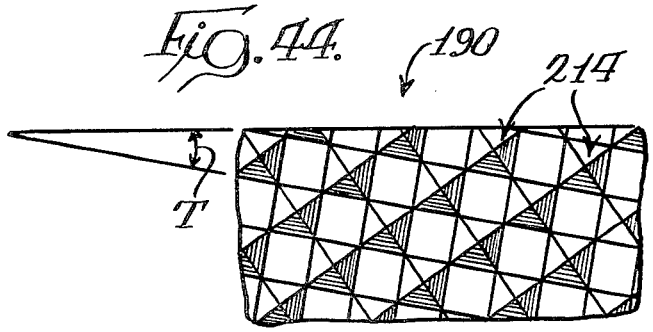

ARTICLE STRAPPING METHOD AND APPARATUS

CROSS-REFERENCE TO RELATED APPLICATION

This application is related to the concurrently filed U.S. patent application Ser. No. 442,523 of Robert Kobiella entitled, "Film Strap Weld."

TECHNICAL FIELD

This invention relates to apparatus and methods for securing together overlapping portions of thermoplastic strap.

This invention further relates to chain assembly components and to methods for fabricating chain assemblies. The chain assemblies may be incorporated in, inter alia, strap securing apparatus.

BACKGROUND OF THE INVENTION AND TECHNICAL PROBLEMS POSED BY THE PRIOR ART

Friction-Fusion Welding Of Strap

A variety of methods have been marketed and/or proposed over the years for securing together overlapping portions of a tensioned loop of thermoplastic strap encircling an article. One method is effected by first compressing the overlapping strap portions together and then creating a unidirectional or multidirectional bodily sliding frictional movement between the contacting surface regions of the overlapping strap portions to melt interface regions of the overlapping strap portions. The melted interface regions are allowed to solidify so as to bond the overlapping strap portions together.

This process, which can be generally described by the term friction-fusion welding, has proven to be especially effective with conventional thermoplastic strap materials such as nylon, polyester, polypropylene, and the like. Such conventional strap is typically provided in widths ranging from 5 mm. to 9.525 mm. and has a thickness ranging between about 0.254 mm and about 0.889 mm.

In conventional tools and machines for effecting a friction-fusion weld between overlapping portions of thermoplastic strap, an engaging member is provided for gripping the outwardly directed surface of one of the overlapping strap portions and an anvil is provided for contacting the outwardly directed surface of the other overlapping strap portion. The strap engaging surface of the engaging member and of the anvil may each be planar or may each be curved for receiving the overlapping strap portions. Relative movement is effected between the engaging member and the anvil so that at least some of the relative movement takes place in a planar or curved locus conforming to the planar or curved interface between the two overlapping strap portions.

Torsion Bar Friction-Fusion Strap Welding Machines

Conventional Torsion Bar Machine Design

A variety of mechanisms have been proposed for effecting the relative motion necessary to friction-fusion welding techniques. Signode 8 Corporation, 3600 West Lake Ave., Glenview, Ill. 60025 U.S.A. (the assignee of the present invention), has developed and currently markets friction-fusion strapping machines which incorporate torsion bar assemblies. The torsion bar assembly is initially stressed and subsequently released to oscillate the strap engaging member, as well as the overlapping strap portion contacting the strap engaging member, for thus effecting the necessary relative motion.

U.S. Pat. Nos. 3,494,280 and 3,548,740, also assigned to Signode Corporation, disclose such torsion bar assemblies in strapping machines. The torsion bar assemblies described in these patents have been further developed and subsequently incorporated in strapping machines marketed by Signode Corporation. Typical of such commercially available machines are those sold under the designations "Power Strapping Machine Models MLN-2A, ML2-EE, ML2-JE, and ML2-HG."

Problems With Low Amplitude Torsion Bar Oscillation

Although the above-described power strapping machines with torsion bar assemblies work well in the many applications for which they were designed to be employed, the inventor of the present invention has determined that it would be desirable to provide an improved torsion bar assembly for use in power strapping machines. The inventor has determined that if a conventional torsion bar assembly design is employed with a relatively short stroke (small oscillation amplitude), then the assembly must be massive enough to accommodate the energy needed to properly form the joint. However, a very short stroke (small oscillation amplitude) is more easily damped out before a sufficient melting of the interface region between the overlapping strap portions can be effected. Although this tendency may be overcome by using a relatively large diameter torsion bar with a small oscillation amplitude, more massive structural supports are then required to accommodate such a design. The inventor of the present invention has determined that, consistent with minimal supporting structure, it is preferable to use a smaller diameter torsion bar with a larger twist angle than to use a larger diameter torsion bar with a smaller twist angle.

Problems With High Amplitude Strap Oscillation

In conventional torsion bar assemblies, the strap engaging member that is oscillated by the torsion bar is part of, or is secured to, the torsion bar. The strap engaging member includes an arm projecting radially outwardly from the torsion bar. With a relatively small diameter torsion bar and with a relatively large twist angle, such a strap engaging member oscillates with a relatively large amplitude. However, in some applications, the large oscillation amplitude causes an unduly large movement of, and tension impact upon, the engaged strap.

The impact can be especially significant at the corners of the article around which the strap has been tensioned. This impact, of course, can place an undesirably high stress on the strap at the corner locations and may also damage the strap and/or article. Accordingly, it has been determined that, in some applications, a reduction in the amplitude or stroke of the strap engaging member would be desirable so as to substantially reduce, if not altogether eliminate, such problems.

As a way to reduce the stroke, the inventor of the present invention has considered locating the strap contacting surface of the strap engaging member as close as possible to the longitudinal axis of rotation of the torsion bar. For example, a design might be considered wherein the radially projecting arm of the strap engaging member is eliminated and wherein the strap engaging member comprises the exterior cylindrical surface of the torsion bar per se. With such a design, the actual amplitude of strap oscillation will be considerably reduced even though the twist angle of the torsion bar can remain relatively large (as desired from the above-discussed standpoint of providing sufficient energy for the friction-fusion weld in a manner that will produce a good weld and yet not require execessive supporting structure for the torsion bar).

Although the above-postulated design of a torsion bar assembly appears, in theory, to provide a solution to the problem of effecting a good weld with sufficient energy and reduced strap movement amplitude, the design suffers from practical drawbacks arising from conflicting design considerations. In particular, with commercial strapping apparatus, especially with strapping machines that automatically encircle an article with the strap, sufficient space must be provided at the friction-fusion welding location to accommodate the initial proper positioning of the overlapping strap portions and the subsequent tensioning of the strap. In addition, sufficient room must be provided to accommodate the various support structures and mechanisms for initially forming the strap into the loop, for gripping one or more portions of the strap, for stressing the torsion bar assembly, and for cutting the welded strap loop from the trailing portion of the strap.

Accordingly, the strap engaging member in a conventional torsion bar strapping machine typically extends radially outwardly from the torsion bar so that the strap engaging member contacts the strap at a location spaced away from the torsion bar by an amount sufficient to provide the required clearance for accommodating the above-described various functions. Unfortunately, with such a design, the amplitude of oscillation of the strap engaging member, and of the engaged strap, will necessarily be relatively large when the torsion bar is stressed through a relatively large twist angle. It would therefore be desirable to provide some mechanism for reducing the amplitude of the oscillation of the strap engaging member (and of the engaged strap) while permitting a relatively small diameter torsion bar to be stressed through a relatively large twist angle.

Problems With Curved Welding Areas

With the conventional torsion bar friction-fusion strapping machines described above, the strap engaging member has a convex strap gripping surface which presses the two overlapped strap portions against an anvil having a generally concentric and concave bearing surface. The strap engaging member and anvil are located in each machine at the bottom of the package or article receiving area so that the bottom of the package or article overlies, and is in close proximity to, the anvil and strap engaging member. The anvil is disposed between the bottom of the article and the strap path so that the overlapping strap portions can be pressed into the concave bearing surface of the anvil by the convex strap engaging member.

With many articles, the bottom of the article is flat and the portion of the tensioned strap extending around the bottom of the article would necessarily tend to conform to the flat bottom of the article. However, because the anvil and strap engaging member are curved, the strap must follow the curved, and longer, path defined between the anvil and the strap engaging member. Thus, after the friction-fusion weld has been completed and the strapped article removed from the machine, there will be a slightly greater amount of slack in the tensioned loop compared to a lesser amount of slack that would be introduced by a flat anvil.

Owing to the generally elastic nature of thermoplastic strap, the small amount of additional slack introduced by the curved anvil is manifested in a slightly reduced tension in the strap loop. This, of course, can be accommodated by drawing a higher initial tension. However, from the standpoint of minimizing the machine power requirements and the strap tensile strength requirements, the inventor has determined that it would be desirable to reduce, if not eliminate altogether, the concave curvature of the anvil and conforming convex curvature of the strap engaging member.

Further, the inventor of the present invention has determined that it is desirable, especially in welding overlapping portions of very thin strap (film strap), to reduce the amount of curvature at the weld region so as to be able to provide a weld extending for a greater distance along the length of the strap than would otherwise be achievable on a practical basis with a conventional curved weld region.

Accordingly, it would be advantageous to provide a torsion bar assembly with a strap engaging member that would move in a relatively linear path against a flat anvil parallel to the bottom of the article rather than in the conventional path curving away from the article.

Chain Assemblies For Slip-Feed Strapping Machines

In the above-described torsion bar strapping machines the strap is initially automatically formed into a loop about the article by a loop-forming system. The system typically includes a main chain assembly supported in a suitable framework to define a generally rectangularly-shaped window or region around the article receiving station in the machine. Fixed to the main chain assembly is a slip-feed strap carrier, such as a pair of spaced-apart rollers, which engages the trailing portion of the strap in a slip-feed manner and which is moved by the main chain assembly around the article to form the strap into a tight loop around the article. An example of such a system is disclosed in the aforementioned U.S. Pat. No. 3,548,740. A modified system is disclosed in the U.S. Pat. No. 4,393,763 assigned to the assignee of the present invention.

The carrier main chain assemblies in such conventional systems are of the well-known multiple strand, metal link and pin type that are guided, as well as driven, by conventional metal sprockets. Although such conventional carrier chain systems work extremely well, abnormally high speed operation of the metal chain assemblies around metal sprockets can produce high noise levels.

In order to increase the efficiency of automated assembly line article strapping, it has become desirable to provide strapping machines with higher and higher operating speeds. However, when strapping machines with metal carrier chains and sprockets are operated at such very high speeds, the operational noise levels become excessive.

In the United States of America the noise levels in work areas occupied by employees are limited by various state and federal regulations. Accordingly, it would be desirable to provide a strap transport system in a power strapping machine that would have the strength and durability of a metal chain but that would have the relatively low noise level associated with nonmetallic belt drive assemblies. Further, with such an improved strap transport system, it would be desirable to provide a structure that could be relatively easily fabricated.

Friction-Fusion Welding Of Thin Film Wide Strap

Although conventional strap works well in a great many applications, the inventor of the present invention believes that it would be highly desirable to provide, in certain special applications, strap that is considerably wider than conventional strap (e.g., two to eight times as wide) and that is considerably thinner (e.g., less than 0.254 mm and typically about 0.08 mm.).

Such strap could advantageously be used in certain applications, including the binding of a stack of newspapers or magazines, and, preferably, may also be transparent. The relatively wide strap would reduce the pressure on the stack of newspapers or magazines, particularly at the corners, and would thereby have less of a tendency to damage the newspapers or magazines. Finally, a relatively thin, transparent, strap readily permits viewing of the portion of the article which is covered by the strap.

With conventional thermoplastic strap having thicknesses of between about 0.254 mm. and about 0.889 mm., the overlapping strap portions are bonded together in a friction-fusion weld to a thickness of between about 0.013 mm. and 0.051 mm. in each overlapping strap portion across the entire width of the strap. Typically, the length of the friction-fusion bond extends for about 10 mm. to about 35 mm. along the length of the overlapping strap portions.

The inventor of the present invention has determined that conventional friction-fusion techniques developed for strap of conventional thickness are difficult to employ satisfactorily with thin film wide strap, especially film strap having a thickness of less than 0.13 mm. and which may be only about 0.08 mm. For one thing, much more energy would be required to melt the entire surface areas of the overlapping wide strap portions in the selected joint region. Further, control of the thickness of the fused material in the thin strap would be difficult. Also, care must be taken to avoid unwanted penetration of one or both of the overlapping strap portions.

The inventor of the present invention has found that additional, unique problems are presented by film strap fabricated from so-called "oriented" materials, such as, for example, strap comprising linear crystallizable polypropylene that has been worked into a thin film having planar molecular orientation of the macromolecular chains with a uniplanar, axial oriented crystalline structure through at least a major portion of the film thickness. An attempt to produce a conventional friction-fusion weld in such film strap across the full width of the strap may result in reduced weld strength and can reduce the strap strength at the weld since the strap orientation is destroyed in the fused region of the weld.

The inventor has thus determined that it would be desirable to provide a method and apparatus for forming a friction-fusion joint or weld in overlapping portions of the thin film strap whereby the overlapping strap portions retain a sufficient amount of tensile strength after formation of the friction-fusion weld to enable the strap to properly function in a tensioned loop around an article at conventional strapping tensions for the applications in which such thin film strap would be used. Such an improved method and apparatus should desirably accommodate various means for effecting the bodily sliding frictional of the overlapping strap portions —including torsion bar actuted mechanisms as well as other non-torsion bar actuated mechanisms.

SUMMARY OF THE INVENTION

Friction-Fusion Weld Pad Design

An apparatus is disclosed for securing a loop of thermoplastic strap around an article so that two overlapping portions of the strap are bonded together by means of a friction-fusion weld. The apparatus includes a strap engaging member for pressing against and gripping the outwardly directed surface of one of the overlapping strap portions. The strap engaging member defines a plurality of spaced-apart, raised, ribs extending parallel to the lengths of the overlapping strap portions. Each rib presents a generally planar contacting surface.

The apparatus also includes an anvil defining a planar strap engaging surface against which the outwardly directed surface of the other of the overlapping strap portions is pressed. Means are provided for effecting relative movement between the anvil and at least the strap engaging member to compress the overlapping strap portions therebetween. Means are also provided for moving the strap engaging member in contact with the strap along a path of motion parallel to the lengths of the ribs.

According to the method for securing the strap, the straps are compressed together between the anvil and the strap engaging member under the desired amount of force and the strap engaging member is moved in a linear path, with the ribs oriented parallel to the length of the strap, so as to cause bodily sliding frictional movement between the overlapping strap portions and a melting of interface regions which subsequently solidify.

Torsion Actuation System

The above-described welding process may be effected with a variety of means for moving the strap engaging member. A novel means is disclosed herein and may be used to effect the above-described strap welding process as well as other strap welding processes. The novel means includes an anchored torsion spring means for being torsionally stressed to store a predetermined amount of energy. An arc of gear teeth is carried by the torsion spring means for rotation with the torsion spring means about an axis of rotation. Also provided is a strap engaging member with a row of rack gear teeth. Means are provided for mounting the strap engaging member with the rack gear teeth engaged with at least some of the teeth of the arc of gear teeth on the torsion spring means. Finally, means are provided for torsionally stressing and then removing the torsion stress from the torsion spring means after the predetermined amount of energy has been stored whereby the strap engaging member is oscillated on the mounting means in linear motion against the overlapping strap portions as the arc of gear teeth is rotated so as to effect the friction-fusion weld.

Lug and Chain Assembly

Embodiments of a novel driven lug for a chain assembly, along with a novel chain assembly incorporating the lug, are disclosed with a method for fabricating the chain assembly. The chain assembly is particularly well suited for high speed operation as a strap carrier chain in an automatic strapping machine.

The driven lug of the chain assembly includes a resilient mounting body portion for being mounted between two adjacent cross members. The mounting body portion defines a convex cavity on each of two opposite ends for receiving a portion of one of the cross members. A driven body portion extends from the mounting body portion and defines an engaging means for being engaged by the selected drive means for driving the chain assembly. An extension body portion projects from the mounting body portion opposite the driven body portion. The extension body portion includes a tapered portion decreasing in thickness with increasing distance from the mounting body portion ends to faciliate insertion of the lug between the two adjacent cross members. Preferably, the extension body portion further includes a portion projecting from the distal end of the tapered portion.

According to the method for fabricating the chain assembly, a conventional chain may be provided and the lug may be separately fabricated from a resilient material. The tapered portion of the lug is inserted between the two adjacent cross members and a pulling force is applied to the tapered portion to force the tapered portion and the mounting body portion into temporary compression between the two adjacent cross members to align the mounting body portion cavities in receiving relationship with the cross members.

Anvil, Gripper, and Cutter Assembly

Also disclosed herein is an assembly for use with a variety of friction-fusion weld pad actuating systems in a strapping machine of the type having (1) an anvil movable between an extended position for engaging a first overlapping strap portion and a retracted position spaced away from the first overlapping strap portion, (2) a strap engaging member for pressing against and gripping the outwardly directed surface of a second overlapping strap portion, (3) means for effecting relative movement between the anvil and at least the strap engaging member to compress the overlapping strap portions therebetween, and (4) means for moving the strap engaging member to cause the bodily sliding frictional movement between the overlapping strap portions.

The assembly includes a first carriage movable relative to the anvil between a retracted position and an extended position. A second carriage is provided and is movable relative to both the first carriage and the anvil between a retracted position and an extended position.

A pair of grippers are pivotally mounted to the first carriage for pivoting between an open position and a closed position against the sides of the anvil to clamp an end of the strap against the anvil.

A pair of cutters are pivotally mounted to the first carriage for pivoting between an open position and a closed position against, or partially extending into, the sides of the anvil to sever the strap at the anvil.

Each gripper is provided with a gripper link pivotally connected to the gripper and pivotally connected to the second carriage. Similarly, each cutter is provided with a cutter link pivotally connected to the cutter and pivotally connected to the second carriage.

Abutment surfaces are located to be engaged by a portion of each gripper when each gripper is pivoted away from the open position with the first carriage in the extended position.

Finally, means are provided for moving the second carriage from the extended position to the retracted position after the friction-fusion weld has been formed whereby rearward movement of the grippers and cutters is initially prevented as the grippers engage and slide along the abutment surfaces and pivot to the open positions and whereby the cutters, grippers, and first carriage are retracted with the second carriage after the grippers pivot to the fully opened positions and are disengaged from the abutment surfaces.

Numerous other advantages and features of the present invention will become readily apparent from the following detailed description of the invention, from the claims, and from the accompanying drawings.

BRIEF DESCRIPTION OF THE DRAWINGS

In the accompanying drawings forming part of the specification, in which like numerals are employed to designate like parts throughout the same, FIGS. 1, 2, 3, 4, 4A, 5, 6, and 7 are fragmentary, simplified, diagrammatic views of the sequence of operation of a strapping apparatus and FIG. 1A shows an enlarged, fragmentary, partial cross-sectional view of the strap dispenser mechanism;

FIG. 8 is an enlarged, fragmentary, perspective view of the strap carrier in a first embodiment of a main chain assembly;

FIG. 9 is a greatly enlarged, fragmentary, perspective view of a first embodiment of one strand or chain assembly of the main chain assembly shown engaged with a large drive sprocket;

FIG. 10 is a greatly enlarged side view of a first embodiment of a lug forming part of the first embodiment of the chain assembly;

FIG. 11 is an end view of the lug of FIG. 10;

FIG. 12 is a fragmentary, partial cross-sectional view of the first embodiment of the chain assembly trained between a guide V-pulley or sheave and the drive sprocket;

FIG. 13 is a greatly enlarged, fragmentary, cross-sectional view taken generally along the plane 13—13 in FIG. 12;

FIG. 14 is an enlarged, fragmentary, perspective view of a second embodiment of one strand or chain assembly engaged with a large V-type drive pulley or sheave;

FIG. 15 is a greatly enlarged side view of a second embodiment of a lug forming part of the second embodiment of the chain assembly illustrated in FIG. 14;

FIG. 16 is an end view of the second embodiment of the lug;

FIG. 17 is a fragmentary, partial cross-sectional view of the second embodiment of the chain assembly trained between a guide V-pulley or sheave and the larger V-type drive pulley or sheave;

FIG. 18 is a greatly enlarged, fragmentary, cross-sectional view taken generally along the plane 18—18 in FIG. 17;

FIG. 19 is a fragmentary, plan view of the anvil, gripper, and cutter assembly of the apparatus with the cover plate removed to show interior mechanisms;

FIG. 20 is a fragmentary, side view of the anvil, gripper, and cutter assembly;

FIG. 21 is a fragmentary, cross-sectional view taken generally along the plane 21—21 in FIG. 20 showing in solid lines the opened grippers and retracted anvil and showing in dashed lines the extended anvil;

FIG. 22 is a fragmentary, cross-sectional view taken generally along the plane 22—22 in FIG. 19;

FIG. 23 is a view similar to FIG. 22, but showing the anvil extended;

FIG. 24 is a view similar to 23, but showing the gripper carriage and cutter carriage also extended;

FIG. 25 is a view similar to FIG. 19 but showing the gripper carriage, cutter carriage, and anvil in the extended positions as in FIG. 24, and showing the cutters and grippers in the closed positions in solid lines and in the open positions in dashed lines;

FIG. 26 is a view similar to FIG. 24, but showing the gripper carriage being moved rearwardly to open the grippers;

FIG. 27 is a fragmentary, front end view taken along the plane 27—27 in FIG. 25 to show the front of the anvil, gripper, and cutter assembly as well as the torsion bar carriages below the anvil, gripper, and cutter assembly;

FIG. 28 is an enlarged cross-sectional view taken generally along the plane 28—28 in FIG. 25;

FIG. 29 is enlarged, cross-sectional view taken generally along the plane 29—29 in FIG. 25;

FIG. 30 is a fragmentary, partial cross-sectional view of the anvil, gripper, and cutter assembly overlying the torsion bar carriages and showing overlapping strap portions being connected with a friction-fusion weld;

FIGS. 31–33 are simplified, fragmentary, cross-sectional views taken generally along the plane 31—31 in FIG. 30 to illustrate the sequence of torsion bar operation (some of the structure unrelated to the torsion bar operation being omitted from FIGS. 31–34 to better illustrate the torsion bar operation);

FIG. 34 is a view similar to FIGS. 31–33, but taken in perspective, to illustrate a further stage of operation of the strapping apparatus;

FIGS. 35–41 are fragmentary, partial cross-sectional views of the anvil, gripper, and cutter assembly showing the sequence of operation with the underlying torsion bar carriages;

FIG. 42 is a top plan view of the weld pad of the strap engaging member;

FIG. 43 is a greatly enlarged, fragmentary, cross-sectional view taken generally along the plane 43—43 in FIG. 42 to illustrate the shape of the weld pad teeth;

FIG. 44 is a view taken generally along the plane 44—44 in FIG. 43; and

FIG. 45, shown on the sheet of drawings with FIG. 30, is a reduced cross-sectional view taken generally along the plane 45—45 in FIG. 30.

DESCRIPTION OF THE PREFERRED EMBODIMENTS

Figure 3:
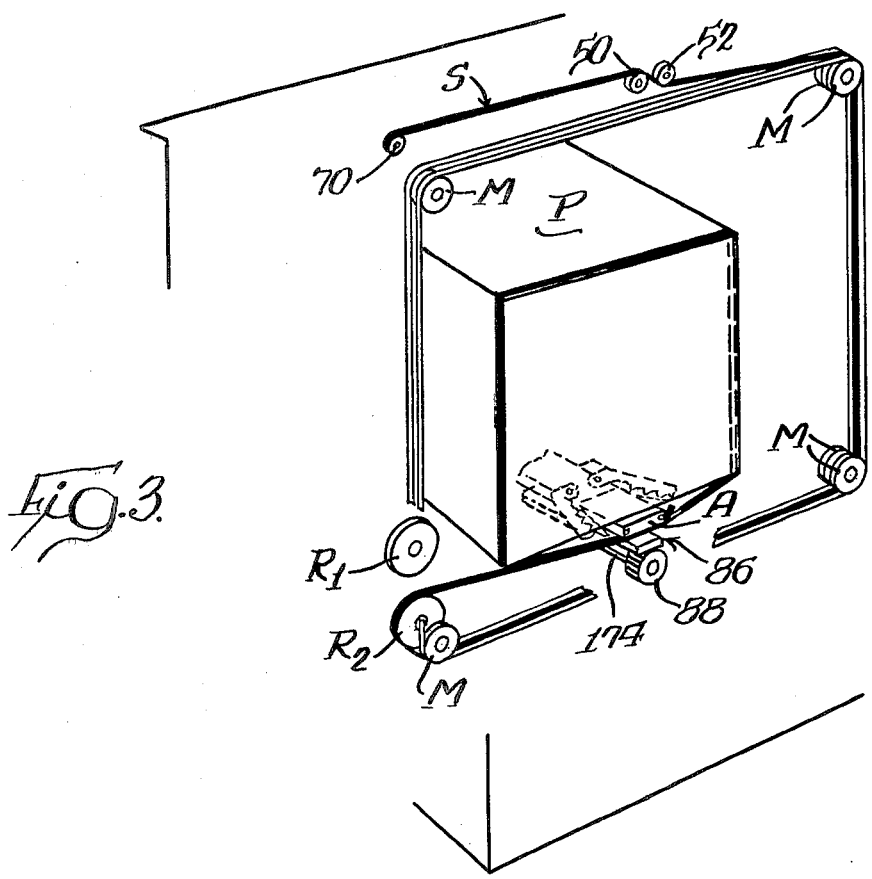

While this invention is susceptible of embodiment in many different forms, there are shown in the drawings and will herein be described in detail various preferred embodiments of the invention. It will be understood, however, that the present disclosure is to be considered as an exemplification of the principles of the invention and is not intended to limit the invention to the embodiments illustrated.

The precise shapes and sizes of the components herein illustrated are not essential to the disclosed apparatus and methods unless otherwise indicated.

It will be understood that the apparatus disclosed herein has certain conventional mechanisms, including drive mechanisms, control mechanisms, and the like, the details of which, though not fully illustrated or described, will be apparent to those having skill in the art and an understanding of the necessary functions of such mechanisms.

General Arrangement Of The Apparatus

Referring now the drawings, the general arrangement and sequence of operation of a novel article strapping apparatus can be best understood with reference to FIGS. 1–7. The apparatus includes a main frame, designated generally by reference numeral F in FIG. 1, which supports a main chain assembly C defining a generally rectangularly shaped article receiving window or station W that accommodates the article or package P which is to be strapped. A support structure (not illustrated) underlies the bottom of the receiving station W in a well known and conventional manner to provide a guideway which receives the opposite ends of the strap S forming a loop about the article P.

In the illustrated preferred embodiment of the article strapping apparatus, the strap S is a wide, thin film strap (e.g., having a width greater than about 10 mm. or more and having a thickness of less than about 0.254 mm. The cross-sectional size of the strap S in the Figures is not to scale and the strap thickness has been exaggerated for ease of illustration.

The main chain assembly C comprises at least two spaced-apart, parallel, strands or chain assemblies $C_1$ and $C_2$ (FIG. 1). The frame F supports the main chain assembly C in engagement with pairs of spaced-apart, rotatable members M which hold the main chain assembly C in the desired rectangular shape about the article receiving window W. Some of the engaging members M may be positively driven by conventional means (not illustrated) to drive the main carrier chain assembly clockwise or counterclockwise about the article receiving window W.

Although only four pairs of chain assembly engaging members M are illustrated in FIGS. 1–4, it is to be realized that additional pairs of members M may be provided either inside or outside of the main chain assembly loop. Depending upon the specific structure of the main chain assembly C, the engaging members M may be V-pulleys (sheaves) or may be toothed sprockets. A first embodiment of a main chain assembly for use with toothed sprockets and a second embodiment of a main chain assembly for use with V-pulleys are described in detail hereinafter.

Mounted to the main chain assembly C is a conventional strap carrier R comprising two spaced-apart rollers $R_1$ and $R_2$. The rollers $R_1$ and $R_2$ are mounted between the two spaced-apart strands or chain assemblies $C_1$ and $C_2$. The strap S passes through the carrier rollers $R_1$ and $R_2$ and thus has a portion which is guided along the main chain assembly C around the outside of the engaging members M. The two strands or chain assemblies $C_1$ and $C_2$ of the main chain assembly C are typically joined in spaced-apart relationship by pins or cross members (or, in some applications, by a center (third) chain strand) which are not visible in FIGS. 1–4. Thus, the strap S is prevented from sagging inwardly (between the two strands or chain assemblies $C_1$ and $C_2$) into the article receiving region W.

Typically, one or more of the chain assembly engaging members M are rotated intermittently in one direction or the other by suitable conventional drive means (not illustrated) to move the chain assembly and hence, the strap carrier R, about the article receiving station W.

A variety of conventional designs may be employed for the specific construction, number, and arrangement of the chain assembly engaging members M, for the means for driving one or more of the chain assembly engaging members M, and for the means for rotating one or more of the chain assembly engaging members M. Reference is directed to U.S. Pat. No. 3,548,740 which shows the arrangement of sprockets with a two-strand chain and to the recently allowed U.S. patent application Ser. No. 261,969 filed on May 8, 1981 (assigned to the assignee of the present invention) which discloses a three-strand chain assembly driven by sprockets.

The apparatus is illustrated in FIG. 1 in an initial position ready to commence an operation cycle of receiving and strapping an article. The free end of the strap S, having been severed from a loop of strap around a previously strapped article, is already gripped by one of a pair of grippers G against the side of an anvil A as best illustrated in FIG. 1 (where the right-hand gripper G is shown gripping the strap S on the right-hand side of the anvil A). The anvil A defines a downwardly facing, planar, strap engaging surface. The anvil and gripper mechanisms are described in greater detail hereinafter.

The strap S extends outwardly (to the left as viewed in FIG. 1), between the rollers $R_1$ and $R_2$ of the strap carrier R. The strap S continues along the exterior of the chain assembly C and between a pair of spaced-apart centering rollers 50 and 52 which allow for the feeding of the strap in either strapping direction around the article P in the article receiving station W. The frame F has a suitable portion (not illustrated) to which the rollers 50 and 52 are mounted.

The strap S is fed to the centering rollers 50 and 52 from a strap dispenser system D illustrated in FIGS. 1, 1A and 2. The system D includes a strap reel 54 mounted for rotation about an axis 56. The strap S is directed from the reel 54 around a dancer arm 58 and then through a series of fixed pulleys 60 and a series of dispenser pull-off pulleys 62 which are mounted on a movable carrier 64 which is biased downwardly by a torsion spring 66. As the strap S extends upwardly to the fixed pulley 60, the strap undergoes one half of a full twist.

From the last pull-off pulley 62, the strap S is trained around a drag brake pulley 68 and then is threaded between a second set of fixed pulleys 70 and slack take-up pulleys 72 which are mounted to a take-up carrier 74 that is biased downwardly by a torsion spring 76.

The strap dispenser system D takes strap from the reel 54, maintains tension on the strap throughout the operation cycle of the apparatus, and then applies additional tension on the strap during the friction-fusion welding step. To this end, the dancer arm 58 is carried by a member 77 engaged with a release tang 78 of a spring brake 80 which is biased to normally lock the dispenser strap reel shaft 56 against rotation. When tension is drawn on the strap S (by movement of the strap carrier R around the article receiving station W), the dancer arm 58 is raised to release the spring brake 80 and permit free wheeling of the strap reel 54. Inertial rotation of the strap reel 54 is absorbed by a conventional torque limiting clutch 82.

General Operation Of The Apparatus

The strapping cycle begins with the apparatus mechanisms at rest in the positions illustrated in FIG. 1. Next, the article P (illustrated in FIGS. 2–7) is positioned in the article receiving station W. The main chain assembly C is driven to first move the strap carrier R in the clockwise direction as viewed in FIGS. 1 and 2 so that a portion of the strap between the anvil A and carrier R is formed into a loop around the article P while a trailing portion of the strap S is maintained by the main chain assembly C outwardly of the article receiving station W.

As the strap carrier R moves in the clockwise direction upwardly from the initial position illustrated in FIG. 1 and then to the right beneath the centering rollers 50 and 52, slack in the trailing portion of the strap S exterior of the chain assembly C is taken up in the strap dispenser system D. The slack is stored in the section of the system between the fixed rollers 70 and the slack take-up pulleys 72 as the slack take-up pulleys 72 are urged downwardly under the action of the torsion spring 76. However, once the strap carrier R moves further to the right beyond the centering rollers 50 and 52, the strap S must be withdrawn from the dispenser system D. When the strap S is pulled from the dispenser system D, the slack take-up pulleys 72 are pulled up to a position almost in line with the fixed pulleys 70 as illustrated in FIG. 2.

After the strap S has completely encircled the article P, and after the strap loop has been pulled tight about the article, the strap carrier R is in the position illustrated in FIG. 2. During the last portion of movement of the strap carrier R, the final tension is applied to the strap loop. The increased tension in strap S, being transmitted back to the dispenser pulleys, causes the dispenser pull-off pulleys 62 to be raised upwardly towards the fixed pulleys 60 as illustrated in FIG. 2.

For ease of illustration, the article P is shown in FIGS. 2–7 with the tensioned strap loop encircled about the article P adjacent the front end of the article. This permits illustration of portions of the anvil A and of friction welding mechanisms that are disposed below the article P. It is to be understood, however, that the article P would normally be strapped somewhat inwardly of either end.

After the strap S has been tensioned tightly in a loop about the article P, the overlapping ends of the strap loop are bonded together with a friction-fusion weld. To this end, a torsion bar-operated welding mechanism is raised into position below the anvil A. The mechanism includes a strap engaging member 86 having a downwardly facing rack gear (not visible in FIG. 2) engaged with an underlying pinion gear 88.

The pinion gear 88 is secured to one end of a torsion rod or bar 174 which is anchored on the opposite (rear) end (not visible below the article P in FIG. 2). A trigger 92 is fixed to the torsion bar 174 and projects downwardly between fingers 94 and 96 which are pivotally mounted to a rotatable cocking member 98. The structural details of these mechanisms are described hereinafter with reference to FIGS. 27–41.

As described in more detail hereinafter, means are provided to bring the strap engaging member 86 into contact with the lower strap portion of the two overlapping strap portions beneath the anvil A so as to compress the strap portions therebetween. Next, the cocking member 98 is rotated to bring one of the two fingers 94 or 96 into engagement with the trigger 92 and to move the engaging finger against the trigger 92. This causes the trigger 92 to pivot about the longitudinal axis of the torsion bar 174 and to twist the torsion bar 174 so as to store a predetermined amount of energy in the bar.

Continued rotation of the cocking member 98 moves the finger past the trigger 92 and permits the trigger 92 to be released. This releases the torsion stress on the torsion bar 174 and causes the torsion bar and pinion gear 88 to oscillate in engagement with the strap engaging member 86. The strap engaging member 86 is mounted, by unique means described in detail hereinafter, to translate the torsional oscillations of the pinion gear 88 into linear motion to cause bodily sliding friction movement between the overlapping strapping portions and thereby melt interface regions which subsequently solidify to form the friction-fusion weld.

Figure 4:
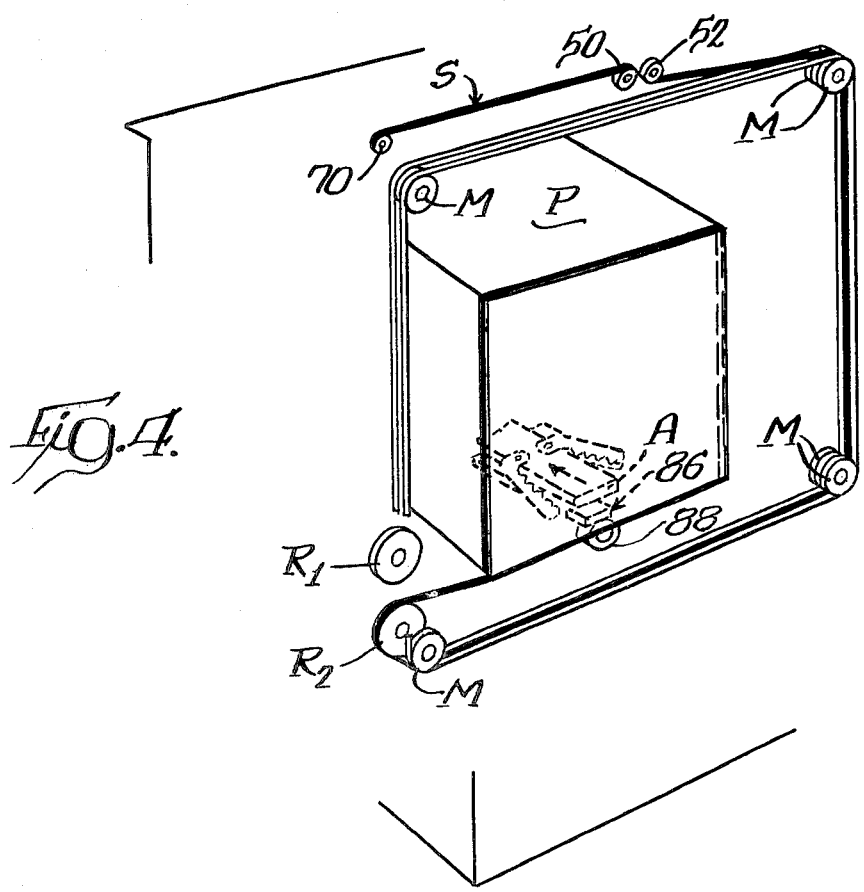

After the weld is completed, the strap engaging member 86 is lowered away from the weld as illustrated in FIG. 3. Subsequently, both the strap engaging member 86 and the anvil A are retracted inwardly below the article P away from the strap area as illustrated in FIG. 4. FIG. 4A shows more clearly the retracted positions of the strapping engaging member 86 from below the article P.

Just before the anvil A is retracted, the gripper G, which is holding the distal end of the strap S against the anvil A, is opened so that the anvil A can be retracted without also pulling back the strap S. As the anvil A retracts, the welded strap snaps upwardly against the bottom of the article P. Owing to the resiliency of thermoplastic strap, the strap loop remains tight about the article A. The small amount of tension that may be lost when the anvil A is retracted from between the article P and the strap S can be accommodated by intially drawing a slightly higher tension in the strap loop before welding the strap so that the tension in the strap loop after retraction of the anvil A is at the desired level.

After the welded strap S has snapped upwardly against the bottom of the article P, the anvil A is then extended back out into the strap path as illustrated in FIG. 5. The strap engaging member 86 remains lowered away from the anvil and retracted below the article P.

Next, as illustrated in FIG. 6, the direction of revolution of the main chain assembly C is reversed to move the strap carrier R in the counterclockwise direction. This carries the trailing portion of the strap S around the left-hand end and bottom of the anvil A.

When the strap carrier R has reached the positon illustrated in FIG. 7, the grippers G are actuated to close so that the left-hand gripper G necessarily engages the strap S and holds it tight against the left-hand side of the anvil A.

As soon as the grippers G have been actuated to close, the strap cutters K are actuated to close into the sides of the anvil A. Thus, the left-hand cutter K severs the strap S against the anvil A just above the point where the trailing portion of the strap S is held against the anvil A by the left-hand gripper G.

Once the strap loop has been severed from the trailing portion of the strap, the article P is free to be manually or automatically discharged from the article receiving station W of the apparatus. The trailing portion of the strap S remains held against the anvil A by the left-hand gripper G and the apparatus is now ready to commence another package strapping cycle.

It is to be noted that the next package strapping cycle begins with the strap carrier R at the lower right-hand corner of the package receiving station W. The carrier R will be moved in a counterclockwise direction about the receiving station W to strap the next article. Upon completion of the next (second) article strapping sequence, the strap carrier R will again be in the initial position that it occupied at the start of the first article strapping cycle as illustrated in FIG. 2.

If desired, the strapping apparatus may be modified to accommodate a "pre-draping" of the strap S partially around the article receiving station W prior to the article being positioned in the article receiving station. Such "pre-draping" systems are conventionally used in some strapping machines. Such systems may include movable article hold-down clamps in combination with active or passive upper and lower strap catch blocks. The strap catch blocks are adapted to be interposed between the strap and the article receiving station. The strap catch blocks may be withdrawn or may otherwise be designed to release the strap after the article has been properly positioned and clamped in the package receiving station.

Examples of such conventional pre-draping systems are described in the above-referenced, recently allowed U.S. Pat. application S.N. 261,969 filed on May 8, 1981 and assigned to the assignee of the present invention. If such pre-draping systems are incorporated with the apparatus illustrated in FIGS. 1–7, the basic mechanisms and operation of the apparatus would remain as illustrated and described above with the exception that the final position of the strap carrier R at the termination of the strapping cycle would be about 180 degrees further advanced in the direction of movement of the next strapping cycle so as to effect the "pre-draping" of the article receiving station with the strap S.

The detailed structures of the various novel mechanisms for effecting the above-discussed package strapping operation will next be described.

Chain Assembly: First Embodiment

The first embodiment of the chain assembly C is illustrated in FIGS. 8–13. With reference to FIG. 8, the strap carrier R is illustrated with the rollers $R_1$ and $R_2$ mounted in the two-strand main chain assembly C between the first strand or chain assembly $C_1$ and the second strand or chain assembly $C_2$.

The construction of each strand or chain assembly $C_1$ or $C_2$ is best illustrated in FIGS. 9, 12, and 13 wherein just one strand or chain assembly $C_1$ is shown engaged with a main chain assembly mounting member M. The construction of the other chain assembly $C_2$ is identical. The two strands or chain assemblies $C_1$ and $C_2$ are maintained in spaced-apart, parallel relationship by pairs of spacer rods or pins 100 which are located along the length of the main chain assembly C. The pins 100 are preferably located along the main chain assembly C at uniformly spaced intervals except where the strap carrier R is mounted to the main chain assembly C.

The chain assembly $C_1$ includes a chain comprising alternate pairs of inner links 102 and outer links 104. The links are preferably fabricated from a rigid, structurally strong material such as steel. The ends of the outer pair of links 104 overlap, and are pivotally connected to, the ends of the inner pair of links 102. Preferably, the connection is effected by a cross member or pin 106 extending between the inner pair of links 102 along the pivot axis associated with each connected inner and outer link.

To best illustrate the principles of the present invention, the pivotal connection and cross member 106 between the inner and outer links has been shown in simplified form. In a somewhat more complex conventional chain structure (not illustrated), each pair of inner and outer links may be pivotally connected together with a rivet pin and the rivet pin may be surrounded by a larger diameter cylindrical member between the two inner links.

In any case, the novel chain assembly of the present invention merely requires that a chain with pivotally connected inner and outer links be provided with a cross member extending between the inner pair of links along the pivot axis. Although the cross member is illustrated as being cylindrical in FIGS. 9, 12, and 13, the cross member may have a noncylindrical shape.

Chain assembly $C_1$ also includes a plurality of lugs 110 which are adapted to engage the chain assembly mounting members M and be guided or driven thereby. In the first embodiment of the chain assembly $C_1$ illustrated in FIGS. 8–13, the lug 110 is adapted to be positively driven by the chain assembly mounting member M having the form of a toothed drive sprocket defining a plurality of circumferential teeth 112.

The lug 110 is fabricated from a nonmetallic, resilient material, such as polyurethane, and is adapted to be secured to a conventional chain in a manner that does not require disassembly of the chain. As best illustrated in FIGS. 10 and 11, the first embodiment of the lug 110 includes a mounting body portion 116 for being mounted between two adjacent cross members 106. The mounting body portion 116 defines a convex cavity 118 on each of two opposite ends of the mounting body portion for receiving a portion of one of the cross members 106.

The lug 110 includes a driven body portion 120 extending from the mounting body portion 116. The driven body portion defines an engaging means for being engaged by the selected drive means for driving the chain assembly. In the first embodiment of the chain assembly $C_1$ illustrated in FIGS. 8–13, the engaging means of the lug driven body portion 120 is a tooth 122 formed on the distal end of the driven body portion. The tooth 122 is adapted to be engaged with the sprocket M between two adjacent sprocket teeth 112.

The lug 110 includes an extension body portion 124 projecting from the mounting body portion 116 opposite the driven body portion 120. The extension body portion 124 includes a tapered portion 126 with a pair of sides 127. The tapered portion 126 decreases in thickness with increasing distance from the mounting body portion ends as best illustrated in FIG. 10. This tapering configuration facilitates insertion of the lug 110 between two adjacent cross members 106. If desired, the tapered portion 126 may also be tapered on the opposite sides 128 as best illustrated in FIG. 11.

The extension body portion 124 of the lug 110 also preferably includes a projecting portion 130 that projects from the distal end of the tapered portion 126. The projecting portion 130 may also be regarded as a "disposable" portion for reasons that will become clear hereinafter. The lug 110 can be pulled by the portion 130 into position in the chain with the mounting body portion 116 retained between the two adjacent cross members 106.

To fabricate the chain assemblies $C_1$ and $C_2$, a link chain, having the features described above, is initially provided. The chain may or may not be conventional. The lug 110 is separately fabricated with the features described above. Preferably, the lug 110 is molded as a unitary piece from thermoplastic material such as polyurethane.

Next, the projecting portion 130 of the lug is inserted between two adjacent cross members 106 of the chain so that the portion 130 partially projects beyond the the cross members 106. Then, the projecting portion 130 is pulled in a direction to force the tapered portion 126 and the mounting body portion 116 into temporary compression between the two adjacent cross members 106 and to ultimately align the mounting body portion cavities 118 in receiving relationship with the cross members 106. Finally, if desired, the disposable portion 130 may be severed from the lug 110 along the plane indicated in FIGS. 10 and 11 by the designation "CUT HERE".

As suggested above, the sides 128 of the tapered portion 126 may also be tapered so that the tapered portion 126 decreases in thickness between those two sides 128 with increasing distance from the mounting body portion 116. The slanted sides 128 may then function as engaging surfaces for contacting, and being guided by, the V-shaped channel 132 of a V-pulley or sheave 134 as best illustrated in FIG. 12.

With continued reference to FIG. 12, it is also to be noted that the taper of the sides 127 of the tapered portion 126 should be as large as necessary to accommodate the smallest radius of curvature through which the chain assembly is designed to operate.

Chain Assembly: Second Embodiment

The second embodiment of the chain assembly is illustrated in FIGS. 14–18. For ease of description, only one strand or chain assembly is illustrated and is designated generally by the reference numeral $C_{1'}$. The chain assembly $C_{1'}$ includes a chain comprising alternate pairs of inner and outer links 102' and 104', respectively, and a cross-member 106' which extends between each inner pair of links 102' along the pivot axis. These chain components are identical to those described above with respect to the chain of the first embodiment of the chain assembly $C_1$ illustrated in FIGS. 8–13.

The second embodiment of the chain assembly $C_{1'}$ is adapted to be employed with a V-pulley or sheave M' which, as best illustrated in FIGS. 17 and 18, defines a generally V-shaped channel 112'. which frictionally engages a lug 110'.

The lug 110' includes a mounting body portion 116' defining cavities 118' which are identical in function to, and which may be structurally identical to, the mounting body portion 116 and cavities 118, respectively, of the first embodiment of the lug 110 described above with reference to FIGS. 8–13. Similarly, the second embodiment of the lug 110' includes an extension body portion 124' which functions in a manner analogous to, and which may be structurally identical to, the extension body portion 124 of the first embodiment of the lug 110.

The second embodiment of the lug 110' does differ from the first embodiment of the lug 110 in one important respect. Specifically, the lug 110' has a driven body portion 120' which defines an engaging means in the form of outwardly facing engaging surfaces 122' for engaging the channel 112' of the V-pulley or sheave.

The second embodiment of the lug 110' may be assembled with a chain to form the completed chain assembly $C_{1'}$ in a manner identical to that employed in assembling the first embodiment of the lug 110 with the chain to form the first embodiment of the chain assembly $C_1$ described above. After assembly, the extension body portion 124', which includes a projecting portion 130', may be severed from the lug 110' along the plane designated in FIGS. 15 and 16 by the term "CUT HERE."

It has been determined by the inventor of the present invention that either of the above-discussed first and second embodiments of the chain assembly functions well when driven at very high speeds. Since the assembly includes a chain comprising connected links fabricated from rigid material, the chain can be relatively strong and inelastic. Various metals may be used to form the chain components depending upon the strength desired.

Further, since a nonmetallic and resilient thermoplastic material can be employed to form the lug for engaging the driving and guiding members (the sprockets or pulleys), operation of the chain assembly at very high speeds is not accompanied by the excessive noise associated with all-metal chain assemblies.

In addition, it is to be noted that the lugs of the chain assembly may be readily inserted into a commercially available (already assembled) conventional chain. No disassembly of the chain is required when adding the lugs.

Finally, if desired, projecting portions at the top of each lug may be readily severed from the lug and the remaining upper portion of the lug may be employed to engage a pulley or sheave for further driving or guiding the chain assembly.

Torsion Bar and Oscillating Welding Assembly

FIGS. 27, 30–34, and 42–45 illustrate in detail the features of the apparatus relating to the torsion bar and to the other oscillating mechanisms which effect the bodily sliding frictional movement between the overlapping strap portions to melt interface regions which subsequently solidify and form the completed friction-fusion weld. These mechanisms have been only briefly described hereinbefore with reference to the simplified diagrams in FIGS. 1–7.

Barrel Cam, Face Cam, and Cocking Shaft

As best illustrated in FIG. 30, the apparatus includes a barrel cam 140 fixed to a cocking and barrel cam shaft 142 which is suitably mounted for rotation in a rear support wall 144 and in a front support wall 146.

The barrel cam 140 defines on its cylindrical surface a single step cam track 148 and on its front face a pair of spaced-apart cams: inner cam 149 and outer cam 150 as best illustrated in FIG. 45. The inner cam 149 has two different constant radius cam surfaces 149A and 149B. The outer cam 150 has four different constant radius cam surfaces 150A, 150B, 150C, and 150D.

For ease of description, the term "barrel cam 140" is used herein to designate the main cylindrical structure defining the barrel cam track 148 on the cylindrical surface as well as the face cams 149 and 150 on the front end surface. Each cam 148, 149, and 150 comprises two halves which are mirror images. Only one half (i.e., 180 degrees) of each cam is used during a single complete strapping cycle as will become apparent hereinafter. The "unused" cam halves function in the subsequent strapping cycle.

The shaft 142 is driven to rotate the barrel cam 140 and face cams 149 and 150 by a suitable means (such as an electric motor, not illustrated) acting through a ring gear 151 (FIGS. 30 and 45) which is coupled in proper timing sequence by a suitable conventional control system (not illustrated) with the drive mechanism for the main chain assembly C (FIG. 1).

As best illustrated in FIGS. 30 and 31–34, the cocking member 98 is keyed to the front end of the barrel cam shaft 142. The cocking finger 94 is pivotally mounted about a pin 152 to the cocking member 98 and the cocking finger 96 is pivotally mounted with a pin 154 to the cocking member 98. Each cocking finger may be pivoted outwardly away from the end of the cocking member 98 (as best illustrated in FIG. 34 for cocking finger 94), but each cocking finger 94 and 96 is normally biased against the end of the cocking member 98 by means of a tension spring 160.

During each complete strapping cycle, the barrel cam shaft 142 is rotated by the drive means 180 degrees in a given direction of rotation and then back again in the reverse direction so that only one half of each cam track is used. During one strapping cycle, the cocking member 98, carried on the shaft 142, is also rotated only 180 degrees and back again between the initial position illustrated in solid lines in FIG. 31 and the "half-way" 180 degree position illustrated in dashed lines in FIG. 31. Thus, during one strapping cycle, only one of the two cocking fingers engages the torsion bar trigger 92. During the subsequent strapping cycle, the barrel cam shaft 142, and hence the barrel cam 140, face cams 149 and 150, and cocking member 98, are all initially rotated 180 degrees in the opposite direction of rotation and then back again so that the other halves of the cam tracks are used and so that the the other cocking finger actuates the trigger 92.

Torsion Bar Carriages And Oscillating Mechanism

Disposed directly above the barrel cam 140 is a first carriage, or torsion bar pivot carriage, 156. The carriage 156 is pivotally mounted to the apparatus frame about pin 158 at the rear of the carriage 156 as best illustrated in FIG. 30. The pin 158 is carried by a suitable portion of the frame (not illustrated). The carriage 156 is biased upwardly (toward the generally horizontal position illustrated in FIG. 30) by a suitable spring 159 (illustrated only schematically in the FIGS. 30 and 35–41 as mounted below the front end of the carriage 156 to a fixed portion of the machine frame).

The front of the carriage 156 has a cam follower 160 disposed between the cams 149 and 150 in the front face of the barrel cam 140. Rotation of the barrel cam 140 to the position illustrated in FIGS. 30 and 45 causes the cam surface 149A of the inner cam 149 to act upon the cam follower 160 and aid the spring 159 in pivoting the torsion bar pivot carriage 156 to the fully elevated position illustrated in FIG. 30 (wherein the strap engaging member 86 is pressed tightly against the bottom overlapping strap portion). Rotation of the barrel cam 140 away from this position causes the outer face cam 150 to pivot the carriage 156 in three stepwise increments against the bias of the spring 159 to the fully lowered position (spaced away from the bottom strap portion) as illustrated in FIG. 41.

The torsion bar pivot carriage 156 includes two spaced-apart side support members 162 as best illustrated in FIG. 27. Each side support member 162 carries a pair of rollers 164 mounted for rotation about a vertical axis. In FIGS. 35–41 the side support members 162 have been deleted to better show interior detail and to show the locations of the rollers 164.

Slidably disposed within the torsion bar pivot carriage 156 is a second carriage, or torsion bar reciprocative carriage, 166 as best illustrated in FIGS. 27 and 30. The torsion bar reciprocative carriage 166 has a V-shaped channel 168 on each side, as best illustrated in FIGS. 27 and 35–41, for receiving a pair of the rollers 164. This permits reciprocation of the carriage 166 between the extended position illustrated in FIGS. 30 and 37 (wherein the strap engaging member 86 is in registry with the overlapping strap portions) and a retracted position (spaced away from the overlapping strap portions) as best illustrated in FIGS. 35 and 39–41. This reciprocation is effected by a cam follower 170 which projects downwardly from the bottom of the torsion bar reciprocative carriage 166 and which is received in the cam track 148 of the barrel cam 140 as shown in FIGS. 30 and 35–41.

As best illustrated in FIG. 30, the torsion bar reciprocative carriage 166 includes two spaced-apart drive members projecting from its top surface: (1) a gripper carriage retraction drive member 169, and (2) an anvil retraction drive member 171 that is located forwardly of the drive member 169. Defined between the members 169 and 171 is a recess 173 for receiving a lug 236 that projects downwardly from the anvil A. The drive members 169 and 171 function to retract mechanisms associated with the overlying anvil, gripper, and cutter assembly in a manner described in detail hereinafter.

The torsion bar reciprocative carriage 166 defines a cavity 172 as best illustrated in FIG. 30 for receiving the torsion bar 174. The torsion bar 174 is anchored at one end (the left-hand end in FIG. 30) to the reciprocative carriage 166. With continued reference to FIG. 30, journal portions of the torsion bar 174 at the other end are mounted in two spaced-apart bearings 176 and 178. The trigger 92 is secured to the front end of the torsion bar 174 between the two bearings 176 and 178.

The pinion gear 88 is mounted to the torsion bar 174 outwardly of the bearing 178; Additional bearings, bearings 180 and 182, are mounted to the torsion bar 174 on either side of the pinion gear 88. The additional bearings 180 and 182 function as a part of the mounting means for mounting the strap engaging member 86 above the pinion gear 88 as best illustrated in FIGS. 30–34.

The strap engaging member 86 actually includes two main elements: (1) a support block 188 disposed on top of the bearings 180 and 182, and (2) a strap engaging pad or weld pad 190 mounted on the support block 188. As best illustrated in FIG. 31, the support block 188 defines a rack gear having teeth 192 on one side positioned so that some of the teeth 192 are engaged with at least some of the teeth of the pinion gear 88. (Although a pinion gear 88 (with teeth extending completely around its circumference) is most conveniently used in the apparatus for engaging the support block rack gear teeth 192, it is to be realized that the torsion bar 174 need carry only an arc of gear teeth of sufficient arc length to accommodate the maximum amplitude of the torsional oscillations of the torsion bar 174.)

The bearings 180 and 182 function to maintain proper clearance between the rack gear teeth 192 and the teeth of the pinion gear 88. Further, these bearings 180 and 182 carry the downwardly directed, normal, reaction force that is imposed upon the strap engaging member 86 when the strap engaging member 86 is moved upwardly to compress the overlapping strap portions against the anvil A during the friction-fusion welding process.

As best illustrated in FIG. 30, the support block 188 defines a convex cylindrical arc support surface 196 on the top of the support block opposite the rack gear teeth 192. The strap engaging pad 190 defines a concave cylindrical arc surface 198 mating with the convex cylindrical arc support surface 196 of the support block 188. The engaging pad 190 further defines, on the top opposite the surface 198, a strap engaging surface 200 which is adapted to contact the underside of the bottom overlapping portion of the strap S.

The strap engaging member 86, which includes the support block 188 and strap engaging pad 190, is maintained in a proper orientation with respect to the strap S by the mounting bearings 180 and 182 and also by a retainer means or rod 202. The rod 202 may be regarded as being part of the strap engaging member mounting means and specifically functions to hold together the support block 188 and the engaging pad 190. The rod 202 further functions to retain the block 188 and pad 190 on the reciprocative carriage 166 as explained in detail below.

The retainer rod 202 is disposed with its longitudinal axis substantially parallel to the planar strap contacting surface of the anvil A (described in more detail hereinafter) and parallel to the paths of the overlapping strap S adjacent the anvil A. As best illustrated in FIGS. 27 and 31, the retainer rod 202 is supported on either end by plates 204 projecting outwardly from the front of the torsion bar reciprocative carriage 166. As best illustrated in FIG. 31, the support block 188 defines a bore 206 extending from one end to the other end and slidably receiving the retainer rod 202 therein. The strap engaging pad 190 has a flange 208 adjacent each end of the support block 188 and each flange 208 defines a bore 210 that slidably receives a portion of the retainer rod 202 therein.

With this unique mounting and retaining structure, the strap engaging pad 190 must necessarily follow a linear path of motion adjacent the anvil A when the pad 190 is pressing the straps against the anvil A. Owing to the engagement of the gear teeth of the pinion 88 with the rack gear teeth 192 of the support block 188, the kinetic energy of the torsional oscillation of the torsion bar 174 is utilized by translating the rotational motion of the torsional oscillation into reciprocating linear motion of the support block 188 and strap engaging member 190.

Weld Pad Surface Configuration

The strap engaging surface 200 of the strap engaging pad or weld pad 190 is best illustrated in FIGS. 42–44. The strap engaging surface 200 preferably comprises a plurality of spaced-apart, parallel, raised ribs 212. The ribs 212 are oriented to extend parallel to the paths of the overlapping strap portions S adjacent the anvil A. Each rib presents a generally planar portion of the strap contacting surface 200.

The strap contacting surface 200 of each rib 212 is preferably defined by a plurality of pyramid shaped teeth 214 as best illustrated in FIGS. 43 and 44. In the illustrated embodiment, the bases of the pyramid shaped teeth 214 have the same configuration and size and all of the teeth 214 are of the same height.

As best illustrated in FIGS. 42 and 44, the pyramid shaped teeth 214 are arranged in a rank and file checkerboard-like pattern on each rib 212. A pair of opposite sides of the base of each tooth 214 are aligned parallel to the ranks and a pair of opposite sides of the base of each tooth 214 are aligned parallel to the files. The teeth 214 in each rank and file are uniformly spaced apart by an amount equal to the length of the base of each tooth. The teeth 214 in each rank and file are staggered relative to the teeth in the adjacent ranks and files, respectively. Each tooth 214 in each rank and file is disposed directly adjacent a space between two teeth in the adjacent rank and file, respectively.

When designing apparatus for effecting a friction-fusion weld in thermoplastic strap with any type of strap engaging weld pad, care must be taken to ensure that the strap will not be unacceptably damaged by the contacting surface of the weld pad. The inventor of the present invention has determined that, with some types and thicknesses of thermoplastic strap, unacceptable damage can occur to the strap when some types of weld pads are forced against the strap at certain force levels and reciprocated within certain frequency ranges. Such damage has manifested itself as a penetration through the overlapping strap portion that is in contact with the weld pad.

Such damaged strap portions appear to have been "milled" by the weld pad and such milling action can remove much of the strap material—at least at certain points in the weld area. This "milling" problem, and its significance, is dependent on, among other things, (1) the surface structure of the weld pad, (2) the welding compression forces, (3) the reciprocation frequencies, (4) the strap material, and (5) the thickness of the strap.

The inventor has determined that the tendency of the weld pad 190 to "mill" through the thin film strap is greatly reduced, if not eliminated altogether, by skewing the ranks or rows of teeth 214 at an angle relative to the lengths of the ribs 212. This angle is designated as angle T in FIGS. 42 and 44. An angle T of 10° has been found to be especially effective in reducing the milling tendency of the weld pad 190, ceteris paribus, with thin film strap.

The strap engaging weld pad 190, with a tooth height of about 0.2 mm. and a tooth base length of about 0.4 mm., has been found to function exceptionally well with thin film thermoplastic strap. The pad 190 is especially effective with strap having a thickness of about 0.08 mm. and comprising linear crystallizable polypropylene that has been worked into a thin film having planar molecular orientation of the macromolecular chains with a uniplanar, axial oriented crystalline structure through at least a major portion of the film thickness. For such 0.08 mm. thick strap having a width of about 50 mm., the weld pad width (dimension U in FIG. 42) is preferably about 48 mm. The planar strap contacting surface of each rib 212 preferably has a width (designated by dimension V in FIG. 42) of about 2.5 mm. With 0.2 mm. high teeth 214, the height of each rib 212, to the top of the teeth, is preferably about 0.35 mm. or more. Further, the ribs 212 preferably have a uniform spacing (designated by dimension X in FIG. 42) along the pad 190 of about 4 mm. With 50 mm. wide strap, this gives a total weld pad contacting surface of about 40 percent of the strap width. A smaller strap contact area of about 30 percent of the width of the strap has also been found to produce acceptable welds.

With oriented thin film strap it is desirable to maintain as much of the orientation of the macromolecular chains as possible in the strap (including at the weld area) so as not to deleteriously affect the strength of the strap. With thin film strap (having a thickness of, for example, 0.13 mm. or less), care must be taken so that the strap weld fused portions (which fused portions are no longer oriented) do not comprise so much of the strap cross section as to adversely affect the strap strength at the weld.

The inventor of the present invention has determined that the above-described approach of providing spaced-apart strap contacting ribs 212 on a strap engaging pad results in acceptable friction-fusion welds of the oriented thin film strap without sacrificing an unacceptable amount of strap strength and weld strength. Since the overlapping strap portions are not welded (i.e., fused) in the spaces between the ribs 212, the strap portions retain substantially all of their original strength in these unfused regions. Further, since the welded or fused regions of the strap run parallel to the length of the strap, the tension stress in the strap can be taken without interruption along the entire length of the weld in the adjacent non-welded (unfused) regions of the strap.

The above-described strap engaging pad structure and friction-fusion welding methods have been employed to weld overlapping portions of strap comprising linear crystallizable polypropylene that has been worked into a thin film having planar molecular orientation of the macromolecular chains with a uniplanar, axial oriented crystalline structure through at least a major portion of the film thickness. The strength of the weld produced was found to be at least about 75 percent of the thin film strap strength. The fused thickness in each overlapping thin film strap portion at such welds appears to range between about 0.013 mm. and about 0.025 mm.

The inventor of the present invention has determined that this novel friction-fusion welding approach works well on thin film straps of various widths. The weld pad 190 illustrated in FIG. 42 has eight spaced-apart strap contacting ribs 212 adapted to be used with 50 mm. wide film strap. For narrower thin film strap, less than eight ribs 212 may be employed. For wider strap, more than eight ribs 212 may be employed.

The strap engaging pad 190 is illustrated in FIG. 42 as having a rib 212 along each side margin of the pad. These outermost ribs 212 would engage the strap along the outer edges of the strap so as to effect a friction-fusion weld of the outer edges. Although it is not necessary that the ribs 212 be provided to weld the outer edges of the overlapping strap portions, a friction-fusion weld of the outermost edges of the strap portions is preferable from the standpoint of eliminating easily accessible, unwelded strap portions that could be grasped or accidentally snagged in a manner that might tend to destroy a portion of the weld area.

The above-described torsion bar and oscillating welding assembly functions well when used in the illustrated strapping apparatus for securing overlapping ends of wide, thin film thermoplastic strap. However, it is to be realized that the assembly may also be employed, with appropriate weld pad surface designs, in strapping machines adapted to secure overlapping ends of coventional, thicker, thermoplastic strap.

Anvil, Gripper, and Cutter Assembly

The anvil, gripper, and cutter assembly, located above the torsion bar carriages 156 and 166, is illustrated in detail in FIGS. 19–30. This assembly includes the anvil A, grippers G, and cutters K, as well as the associated actuating mechanisms, which have been only briefly described hereinbefore with reference to the simplified diagrams in FIGS. 1-7. The anvil A is disposed to move with, and relative to (1) a first carriage or cutter carriage, 288, and (2) a second carriage, or gripper carriage, 258. The anvil A will first be described, followed next by a description of the grippers G and gripper carriage 258 and then by a description of the cutters K and cutter carriage 288.

As best illustrated in FIGS. 19, 21-23, and 27, the anvil A is adapted to be reciprocated between a retracted position (illustrated in solid lines in FIGS. 19 and 21) and an extended position (illustrated in dashed lines in FIG. 21 and in solid lines in FIGS. 23, 27, and 30). In the extended position, the anvil A abuts a member 220 which is mounted to the frame by suitable means (not illustrated) and which limits the outward movement of the anvil A.

As best illustrated in FIG. 27, the anvil A is disposed beneath a cover plate 222 and has a strap bearing plate 224 on its bottom surface facing the strap engaging pad 190. An elastomeric bearing pad 226 is secured to the underside of the bearing plate 224 and defines a downwardly facing, planar, strap engaging surface. The pad 226 functions to prevent slippage of the upper overlapping strap portion that is pressed against the pad 226 during the friction-fusion welding operation.

As shown in FIGS. 21 and 27, the anvil A has on each of its vertical sides an elastomeric insert member 228 against which the grippers G can press the distal end of the strap S. The anvil A also includes on each side, above the elastomeric insert member 228, a channel 230 for receiving the blade portion of one of the cutters K as shown in FIGS. 20, 25, and 27.

As can be seen in FIG. 22, the rear half of the anvil A has a downwardly stepped portion 232 which is received (as best illustrated in FIGS. 27 and 29) between two spaced-apart guide plates 234 and which has flange portions 236 extending over the top surface of each plate 234 at the corner of each plate. This configuration permits the anvil A to be reciprocated in sliding relationship on, and relative to, the guide plates 234.

As best illustrated in FIGS. 20, 22 and 28, the anvil A has, at the rearward end of the stepped guide portion 232, a downwardly projecting lug 236. The lug 236 is adapted to be engaged by the drive member 171 on the torsion bar reciprocative carriage 166 for pulling the anvil A inwardly from the extended position illustrated in dashed lines in FIG. 21 to the retracted position illustrated in solid lines in FIG. 21.

Finally, as best illustrated in FIG. 23, the anvil A has a novel structure at its rearward end that accommodates a number of other mechanisms. The rear portion of the anvil A defines a slot 242 for receiving the cutter carriage 288 which is described in detail hereinafter. The structure at the rearward end of the anvil A also includes a bore 238 for receiving a shock absorber push rod 340 as described in detail hereinafter. Further, as best illustrated in FIGS. 21 and 29, the anvil A defines, on either side of the bore 238, a bore 240 for receiving the anvil return spring guide rod 310 described hereinafter in detail.

The Grippers and Gripper Carriage

The grippers G are mounted to pivot about pins 292 against either side of the anvil A between the open position illustrated in dashed lines in FIG. 25 and the closed position in solid lines in FIG. 25. As best illustrated in FIGS. 19 and 21, each gripper G extends alongside the rear portion of the anvil A when the grippers are in the open position. Each gripper G is thus disposed adjacent a retaining means or rail 246 which has an angled front abutment surface 248 for purposes that will become clear hereinafter. Each rail 246 is mounted adjacent a side member 250 as best illustrated in FIGS. 21 and 27. Each side member 250 is disposed between a guide plate 234 on the bottom and the cover plate 222 on the top.

With reference to FIGS. 20 and 21, each gripper G is seen to have an elongate horizontal slot 255 extending completely through the gripper. Each gripper G is pivotally connected at its rearward end about a pivot pin 252 to a link 254 received in the gripper slot 255. Each link 254 extends inwardly behind the anvil A and cutter carriage 288 and is pivotally connected by means of a pin 256 to the gripper carriage 258.

As best illustrated in FIG. 28, the gripper carriage 258 has three forwardly projecting, spaced-apart portions: an upper portion 260, a middle portion 262, and a lower portion 264. A horizontal upper slot 266 is defined between the upper portion 260 and middle portion 262. A horizontal lower slot 268 is defined between the middle portion 262 and the lower portion 264. The gripper links 254 extend from the grippers G into the lower slot 268 of the gripper carriage 258.

As best illustrated in FIGS. 21 and 22, the gripper carriage 258 extends reardwardly and defines (1) a central pusher rod bore 270 and (2) an anvil rod and spring bore 272 on either side of the central pusher rod bore 270. The central pusher rod bore 270 is in axial alignment with the pusher rod bore 238 defined in the lower portion of the anvil A. Similarly, the anvil rod and spring bores 272 are in axial alignment with the bores 240 defined in the lower portion 232 of the anvil A. However, each anvil rod and spring bore 272 in the gripper carriage 258 has a greater diameter than the corresponding bore 240 in the anvil A as is clearly seen from FIG. 21 and as can be seen by comparing FIGS. 28 and 29. The larger bores 272 accommodate anvil return springs 314 around the guide rods 310.

As best illustrated in FIGS. 21 and 22, the rearward portion of the gripper carriage 258 also defines a bore 274 for receiving a gripper carriage return drive spring and shock absorber mounting member 320 that is described in detail hereinafter. Also, the bottom of the rearward portion of the gripper carriage 258 is provided with a bearing member or pad 276 for being engaged by the previously described retraction drive member 169 that projects upwardly from the top surface of the underlying torsion bar reciprocative carriage 166.

The forward portion of the gripper carriage 258 is specifically adapted to accommodate part of the cutter carriage 288. With reference to FIGS. 21, 22, and 28, the front portion of the gripper carriage 258 defines a vertically oriented slot for receiving a cutter carriage guide pin 290 which is mounted to the cutter carriage 288 as described in detail hereinafter.

The lower portion 264 of the gripper carriage 258 is terminated by a vertical front surface 284 (FIG. 22) to provide a recess for accommodating the lug 236 at the rear of the anvil A when the gripper carriage 258 has been moved forwardly behind the extended anvil A as best illustrated in FIG. 24.

Cutters and Cutter Carriage

As best illustrated in FIGS. 21 and 22, a cutter carriage 288 is slidably disposed between the anvil A and the gripper carriage 258. The rear portion of the cutter carriage 288 has a generally triangular shape and, as best seen in FIG. 24, the rear portion of the cutter carriage 288 is adapted to be partially received in the gripper carriage lower slot 268.

The middle portion of the cutter carriage 288 is thicker than either the rear or front portion of the cutter carriage and provides support on its upper surface for linkage mechanisms described in detail hereinafter. The thinner forward portion of the cutter carriage 288 is adapted to extend into the anvil slot 242 (as illustrated in FIG. 22) when the anvil A and cutter carriage 288 are both in the retracted positions (FIG. 22) or are both in the extended positions (FIG. 24).

As best illustrated in FIGS. 21 and 22, the rear portion of the cutter carriage 288 carries the pin 290 which is guided by the walls of the vertical slot 280 in the gripper carriage 258. When the anvil A is fully retracted, the pin 290 is spaced forwardly of the closed end of the slot 280 as illustrated in FIG. 19. However, when the anvil A is fully extended and when the gripper carriage 258 is also fully extended as illustrated in FIG. 24, the pin 290 is located adjacent the closed end of the slot 280.

As best illustrated in FIGS. 20 and 21, the thin forward portion of the cutter carriage 288 extends laterally outwardly on each side through the slots 255 in the grippers G. Each gripper G is pivotally mounted with pin 292 to the cutter carriage 288 in the slot region.

As best illustrated in FIGS. 27 and 29, each cutter K includes a blade holder portion formed in the shape of a sideways oriented "U" with an upper leg 294 and a lower leg 296. A cutter blade 298 is secured between the upper leg 294 and lower leg 296. A spacer 300 is disposed between the upper side surface of the blade 298 and the upper leg 294 of the cutter blade holder.

Each cutter K has a generally L-shaped configuration as best illustrated in FIGS. 19 and 25. Each cutter K is pivotally mounted at the foot of the L-shaped configuration to the thickened middle portion of the cutter carriage 288 by means of a pin 302. As best illustrated in FIGS. 19 and 29, a generally rectangular cutter tie link spacer 304 is disposed between the upper and lower legs 294 and 296, respectively, of each cutter K and is provided with suitable bores for accommodating the pivot pins 302.

As best illustrated in FIGS. 25, 28, and 29, the rear portion of each cutter K carries, at its lateral margin, a pin 306 extending between the upper leg 294 and lower leg 296 of the cutter K. One end of a cutter link 308 is disposed between the cutter upper leg 294 and cutter lower leg 296 and is pivotally mounted therebetween about the pin 306. The other end of the link 308 is disposed within the upper slot 266 of the gripper carriage 258 and is pivotally mounted about the pin 256 above the end of the gripper link 254 which is also pivotally mounted to the pin 256 as previously described.

As best illustrated in FIG. 19, each cutter K has a plurality of cutting teeth 299 on the edge of the blade 298 facing inwardly toward the side of the anvil A. When the cutters K are actuated to close inwardly to sever the strap as illustrated in FIGS. 25 and 27, the cutter blade 298 is received within the slot 230 defined in the side of the anvil A.

Drive Spring and Shock Absorber Assemblies

As best illustrated in FIGS. 21 and 29, each anvil bore 240 slidably receives an anvil spring guide rod 310. Each guide rod 310 extends rearwardly from the anvil A and through the larger bores 272 in the gripper carriage 258. The helical springs 314 are disposed around the rods 310 in the bores 272. As best illustrated in FIGS. 21 and 23, each spring 314 has a forward end engaging the rear of the anvil A at the back of the lug 236 (FIG. 23).

The rear end of each spring 314 engages a nut 316 threaded on the end of the rod 310 and disposed within the gripper carriage bore 274. With reference to FIG. 23, it can be seen that the spring 314 can extend sufficiently beyond the gripper carriage bore 272 when the gripper carriage 258 is in the rearward position to maintain the anvil A in the extended position. As best illustrated in FIG. 21, the nut 316 at the rearward end of each anvil guide rod 310 is prevented from moving rearwardly out of the bore 274 by virtue of its engagement with a hollow cylindrical member 320 which is threadingly engaged with the gripper carriage 258 in the bore 274.

The member 320 has internal cylindrical bore 322 with a threaded opening at the rearward end for receiving a threaded, shock absorber unit 324. A nut 326 is locked up against the rear end of the member 320. A helical, gripper carriage drive spring 328 is disposed in compression around the shock absorber 324 with one end of the spring 328 bearing against the nut 326 and with the other end of the spring 328 bearing against a fixed portion of the apparatus frame (not illustrated). The spring 328 thus functions to continuously bias the member 320 along with the connected shock absorber unit 324 and gripper carriage 258 toward the forward extended position (illustrated in FIG. 24).

The shock absorber unit 324 includes a piston rod 325 which is damped in either direction of movement by the unit 324 in a conventional manner. The distal end of the rod 325 is secured to a shock absorber piston 332 which is slidably disposed within the bore 322 of the cylindrical member 320. The piston 332 is biased toward the right-hand end of the bore 322 by a helical compression spring 334 disposed within the bore 322 with one end bearing against the shock absorber 324 and with the other end received within an annular groove 336 of the piston 332. Movement of the piston 332 toward the right, as viewed in FIG. 21, is limited by contact with the nuts 316.

The shock absorber push rod 340 is secured on one end to the piston 332 as best illustrated in FIGS. 21 and 22. The push rod 340 is slidably disposed within the bore 270 of the gripper carriage 258 and extends forwardly beyond the gripper carriage 258 into the anvil bore 238 as best illustrated in FIGS. 23, 24, and 29.

Apparatus Operation During A Strapping Cycle

The operation of the above-described mechanisms will next be discussed with reference to operation of the machine through one complete strapping cycle. The initial start position of the machine is diagrammatically illustrated in FIG. 1. At this start position, the torsion bar pivot carriage 156 (as well as the reciprocative carriage 166 carried thereon) has been already pivoted downwardly (as illustrated in more detail in FIG. 35) where it is held by the surface 150A on the outer face cam 150. Also, the reciprocative carriage 166 has been retracted by the barrel cam track 148 to pull the strap engaging member 86 out of the strap path and away from the anvil A.

Since the torsion bar carriage 166 is in the lowered position, the gripper carriage retraction drive member 169 is disengaged from the gripper carriage bearing pad 276 and the anvil retraction drive member 171 is disengaged from the anvil retraction lug 236 as best illustrated in FIGS. 24 and 35. Accordingly, the gripper carriage 258 is biased to its extended position by the drive spring 328 and the anvil A is biased to the fully extended position against member 220 by the anvil return springs 314 (one coil of one spring 314 being visible in FIG. 24 and a greater portion of the one spring 314 being visible in FIG. 23).

With the gripper carriage 258 and anvil A in the fully extended positions illustrated in FIG. 24, the grippers G are closed against the sides of the anvil A (shown in solid lines in FIG. 25) and the cutters K are closed against the sides of the anvil A (also shown in solid lines in FIG. 25). Thus, as illustrated in FIG. 1, the distal end of the strap S is held against the side of the anvil A by the right-hand gripper G below the closed cutter K. The strap S extends to the left through carrier R.

Before initiating the strapping cycle, an article or package P is properly positioned in the article receiving window W as best illustrated in FIG. 2. Since the torsion bar carriage 166 is retracted as illustrated in FIGS. 2 and 35, the strap S can be pulled around the article receiving window W by the carrier R to form a tight loop about the article. This positions the lower overlapping strap portion against, and underneath, the upper strap portion that is held against the anvil A.

Movement of the main carrier chain assembly C actuates a conventional proximity switch (not illustrated) to initiate, through conventional control means not illustrated, the rotation of the ring gear 151 and shaft 142. As the shaft 142 and barrel cam 140 rotate to drive the carriage roller 170 from the rearward end of the barrel cam 140 to the forward end of the barrel cam in the track 148, the torsion bar reciprocative carriage 166 is moved forwardly to the position illustrated in FIG. 36. The strap engaging member 86 and pinion gear 88 are thus moved forwardly below the anvil A but above the carrier chain assemblies C₁ and C₂ and above the trailing portion of strap S.

As the carriage 166 moves forward to the extended position as shown in FIG. 36, the spring 159 continues to force the carriage 156 (and hence, carriage 166) upwardly. Since the barrel cam 140 has rotated the outer face cam surface 150A away from the roller 160, the roller 160 is free to move upwardly toward the recessed face cam surfaces 150B and 150C as each of these surfaces rotates past the roller 160. However, as illustrated in FIG. 36, the roller 160 does not contact these outer cam surfaces as the carriage 166 is moved *outwardly* because the top of the carriage 166, (i.e., the drive member 169) hits the bottom of the overlying gripper carriage 258 and slides along the bottom of the gripper carriage 258 as the carriage 166 moves to the extended position.

A switch (not illustrated) on the cam shaft 142, through conventional control means, terminates further movement of the chain assemblies C₁ and C₂ to thereby stop the feeding of the strap S when the carrier R has reached the final tensioning position shown in FIG. 2.

When the carriage 166 has been fully extended, the drive member 169 on the top of the reciprocative carriage 166 has moved forward of the gripper carriage bearing pad 276 (FIG. 37) and the carriage 166 may be moved upwardly further with the pivot carriage 156 under the action of the spring 159. The inner face cam surface 149A contacts the roller 160 and aids the spring 159 in urging the roller 160 upwardly towards the most recessed outer face cam surface 150D so that the torsion bar pivot carriage 156 (and hence the reciprocative carriage 166 carried thereon) pivots to the fully elevated position illustrated in FIGS. 2 and 37. In this position, the retraction member 169 of the carriage 166 is received between the gripper carriage bearing pad 276 and anvil retraction lug 236. The inner face cam surface 149A thus functions to positively force the strap engaging member 86 upwardly against the overlapping strap portions to compress the overlapping strap portions between the strap engaging member 86 and the bottom of the anvil A under the desired pressure.

At the same time, the barrel cam shaft 142 is rotating the cocking member 98 and cocking finger against the trigger 92 as illustrated in FIG. 32. This stresses and then releases the torsion bar 174 to oscillate the strap engaging member 86 in the manner previously described in detail. In one form of the embodiment illustrated, the welding oscillations of the strap engaging member 86 are damped out after about 17–20 milliseconds when the maximum initial amplitude of the oscillations is about 9 mm. on 48 mm. wide thin film strap.

As the strap engaging member 86 vibrates against the strap S, the barrel cam 140 continues rotating until the cocking member 98 is positioned 180 degrees from its initial start position (shown in dashed lines in FIG. 31). At this point, with the actuated trigger 92 being located midway between the cocking fingers 94 and 96, the rotation of the shaft 142 is reversed. The rotation is reversed in response to a limit switch (not illustrated) on the cam shaft 142 which, through appropriate control means (not illustrated), reverses the direction of the drive means (e.g., a motor) associated with the ring gear 151.

From a point just prior to the reversal of shaft rotation to a point just subsequent to reversal of the shaft rotation, the strap engaging member 86 is maintained against the overlapping portions of the strap S through the front face inner cam surface 149A (FIGS. 30 and 37). This keeps the strap portions under pressure for a short period of time (about 20 milliseconds) after the strap engaging member oscillations have been damped out and allows the friction-fusion weld to cool under pressure.

As the shaft 142 continues to rotate in the reverse direction, the cocking finger engages the trigger 92 as illustrated in FIG. 34 and is pivoted back to clear the trigger 92.

The continued rotation of the shaft 142 causes the barrel cam front face outer cam surface 150C to engage the roller 160 and to pivot the torsion bar pivot carriage 156 (and hence the reciprocative carriage 166 carried thereon) downwardly a small amount (about 2 mm.) in order to release the compression of the welded overlapping strap portions. The small drop of the strap engaging member 86 is illustrated in FIG. 38 where the distance between the strap engaging member 86 and the bottom surface of the bottom overlapping strap is designated by the reference letter Z.

The track 148 of the barrel cam 140 next causes the torsion bar reciprocative carriage 166 to begin retracting rearwardly. Since the front of the carriage 166 has been dropped only a small amount, the gripper carriage retraction drive member 169 and the anvil retraction drive member 171 on the carriage 166 are aligned to engage the gripper carriage bearing pad 276 and the anvil retraction lug 236, respectively.

As best illustrated in FIG. 26, the anvil retraction lug 236 is initially received in the recess 173 of the torsion bar reciprocative carriage 166 and is spaced rearwardly of the anvil retraction drive member 171. The gripper carriage retraction drive member 169 engages the gripper carriage bearing pad 276 before the anvil retraction lug 236 can be engaged by the anvil retraction drive member 171. The gripper carriage 258 is first moved rearwardly by the gripper carriage retraction drive member 169 in order to open the cutters K and grippers G before the anvil A is retracted.

When the gripper carriage 258 is moved rearwardly from the solid line position shown in FIG. 25 to the dashed line position shown in FIG. 25, the pins 256 mounted in the gripper carriage 258 act to pull the gripper links 254 and the cutter links 308 rearwardly. However, it is to be noted that the rear end of the each gripper G engages the angled abutment surface 248 on the side retaining rail 246 which prevents rearward movement of the grippers G. Thus, as the gripper carriage 258 moves rearwardly (in the direction of the dashed arrow 346 shown in FIG. 25), each gripper link 254 acts to slide the rear end of the gripper G inwardly along the angled abutment surface 248 and pivot the gripper G about the pivot pin 292. This forces the front end of each gripper outwardly to the postion illustrated in dashed lines in FIG. 25. With the grippers pivoted open, the distal end of the strap is no longer clamped against the side of the anvil A.

As the grippers G pivot open, the cutter links 308 are also being pulled rearwardly by the gripper carriage 258. Since the cutters K are mounted about pins 302 to the cutter carriage 288, and since the grippers G are also mounted to the cutter carriage 288, the rearward movement of the cutter links 308 cannot cause rearward movement of the cutters K and connected cutter carriage 288 until the rear end of each gripper G clears the angled abutment surface 248. Consequently, the initial rearward movement of the cutter links 308 operates only to pivot the cutters K about pins 302 to the open positions illustrated in dashed lines in FIG. 25.

Owing to the particular shape of the cutters K and grippers G and owing to the different locations of the cutter and gripper pivot points, the grippers G begin to pivot outwardly away from the sides of the anvil A slightly before the cutters K have been retracted from the anvil receiving slots.

Since the gripper carriage 258 is connected to the cutter carriage 288 through the cutters K and cutter links 308 and also through the grippers G and gripper links 254, relative movement can take place between the gripper carriage 258 and the cutter carriage 288 as the grippers G and cutters K pivot outwardly toward the open positions. As the grippers and cutters pivot open with the rearward movement of the gripper carriage 258, the gripper carriage vertical slot 280 moves rearwardly relative to the guide pin 290 carried in the rear portion of the cutter carriage 288. This movement is seen by comparing the solid line position of the gripper carriage 258 shown in FIG. 25 to the gripper carriage position in FIG. 26. In FIG. 25 the pin 290 is near the back of the slot 280 and in FIG. 26 the pin 290 is near the front of the slot 280.

When the cutters K and grippers G have been fully opened, the anvil A is retracted by engagement of the retraction member 171 with the anvil lug 236 as illustrated in FIG. 22. As the anvil A is retracted, the welded strap slips off the anvil and snaps upwardly against the bottom of the article P as best illustrated in FIG. 4A.

As the gripper carriage 258 and anvil A move to the fully retracted positions, the rearward end of each gripper G is pulled inwardly and free of the abutment surface 248 so that the gripper G slides along the inside of the retaining rail 246 to the fully retracted position as best illustrated in FIG. 21. The fully retracted positions of the gripper carriage 258 and of the anvil A are determined by the maximum rearward movements of the gripper carriage retraction drive member 169 and anvil retraction drive member 171, respectively. The rearward movements of these two drive members, which are carried by the torsion bar carrier 166, are terminated at a rearwardmost position by the barrel cam track 148 as illustrated in FIG. 39.

After the barrel cam 140 has rotated to drive the torsion bar reciprocative carriage 166 to the rearwardmost position (along with the engaged anvil A and gripper carriage 258), a suitable control system switch (not illustrated) on the cam shaft 142 is actuated to initiate movement of the carrier chain C to drive the carrier R (FIG. 4A) in the opposite direction (counter-clockwise as viewed in FIG. 4). As the carrier R starts to move back across the receiving station W (below the bottom of the article P and anvil A), the cam surface 150B on the front face of the barrel cam 150 engages the roller 160 and tilts the torsion bar pivot carriage 156 further downwardly so that just the anvil retraction drive member 171 is disengaged from the anvil retraction lug 236 and so that the gripper carriage 258 is still held retracted by the drive member 169. This allows the anvil A to be urged by the anvil return springs 314 to the extended position illustrated in FIGS. 23 and 40. The anvil A is stopped at the fully extended position by the abutment member 220. The anvil A is thus located again in the strap path beneath the strapped article P. The friction-fusion welded strap, however, is now located between the bottom of the package and the top of the anvil A as illustrated in FIG. 5.

When the anvil A is in this extended position, the gripper carriage 258 is still maintained in the retracted position by engagement of the gripper retraction drive member 169 with the gripper carriage bearing pad 276 as illustrated in FIGS. 23 and 40. Owing to the fact that the cutters K and grippers G are pivotally mounted to the cutter carriage 288, and owing to the fact that the cutters K and grippers G are connected by the cutter links 308 and gripper links 254, respectively, to the retracted gripper carriage 258, the cutters K and grippers G also remain in the retracted (and opened) positions below the article P as illustrated in FIGS. 5 and 23.

The anvil A reaches the fully extended position illustrated in FIGS. 23 and 40 just as the strap carrier R is beginning to move back across the bottom of the article P from the position illustrated in FIG. 4A toward the position illustrated in FIG. 6. As the strap carrier R moves to the right as illustrated in FIGS. 6, the trailing portion of the strap S wraps around the left-hand side and bottom surface of the anvil A.

As the barrel cam 140 continues to rotate, cam surface 150A in the barrel cam front face cam 150 engages the roller 160 and tilts the torsion bar pivot carriage 156 (and hence the torsion bar reciprocative carriage 166 carried thereon) even further downwardly to the lowermost position (illustrated in FIG. 41) where the carriages 156 and 166 remain until the start of the next strapping cycle. The final downward movement of the carriages 156 and 166 disengages the gripper carriage drive member 169 from the gripper carriage bearing pad 276 as illustrated in FIG. 41 (and in greater detail in FIG. 24). This permits the gripper carriage 258 to be biased forwardly by the gripper carriage return drive spring 328.

As the gripper carriage 248 moves forwardly, the grippers G and cutters K are moved forwardly in their open positions owing to the toggle linkage connections between the cutter carriage-mounted grippers G, the cutters K, and the gripper carriage 258. The grippers cannot initially close since their pivoting action about pins 292 is prevented by the side rails 246. This also prevents any relative movement between the gripper carriage 258 and the cutter carriage 288 since the entire linkage system of the gripper links 254, the grippers G, and the cutter carriage 288 is prevented from pivoting by the side rails 246. With relative movement between the gripper carriage 258 and the cutter carriage 288 prevented, the cutter links 308 are also necessarily prevented from moving relative to the cutter carriage 288. The cutters K are thus maintained in the open position as they move forward in unison with the open grippers G, with the cutter carriage 288, and with the gripper carriage 258.

Continued forward movement causes the front end of the cutter carriage 288 to seat against the end of the anvil slot 242 as illustrated in FIG. 24. Further forward movement of the cutter carriage 288 is thus prevented. However, just before the cutter carriage 288 reaches the end of anvil slot 242, the rear end of each gripper G passes the rearwardly slanted abutment surface 248 of the side retaining rail 246 (best illustrated in FIG. 25). Then, the rear end of each gripper G can begin to pivot outwardly.

With the cutter carriage 288 restrained against further forward movement at the end of the anvil slot 242, the gripper carriage 258 continues moving forwardly relative to the cutter carriage 288 so that the gripper carriage slot 280 receives the cutter carriage pin 290 further to the left-hand end of the slot as illustrated in FIG. 25 (compare with FIG. 19). This further movement of the gripper carriage pivots the forward ends of the fully extended grippers G and cutters K to close against the sides of the extended anvil A.

As shown in FIG. 7, the strap wrapped around the left-hand side of the anvil A is thus gripped by the left-hand gripper G. Owing to the pivot locations of the toggle linkage design, the cutters K do not enter completely into the anvil slots 230 (FIGS. 20 and 27) until the grippers G have closed against the sides of the anvil A. Ultimately, however, each cutter K is pivoted to the inwardly most position within the anvil slot 230 above the associated gripper G. As illustrated in FIG. 7, the left-hand cutter K then severs the strap at the side of the anvil A above the already closed gripper G. This separates the welded strap loop around the article P from the trailing portion of the strap S. The article P may now be removed.

Since the gripper G has clamped the strap S against the left-hand side of the anvil A as shown in FIG. 7 prior to the severance of the strap by the cutter K, the clamped end of the strap S remains properly engaged with the anvil A for the next strapping cycle.

As the grippers G and cutters K are moved forwardly and into the closed positions by the gripper carriage 258 and cutter carriage 288, shock loading to the assembly is reduced by the interaction of certain components as will next be described. Prior to the forward end of the cutter carriage 288 hitting the end of the slot 242 in the anvil A, the forward end of the pusher rod 340 (which is retracted from the anvil bore 238 in FIG. 23) is moved forward against the end of the anvil bore 238. Continued forward movement of the gripper carriage 258 and of the linkage-connected cutter carriage 288 continues under the urging of the gripper carriage return spring 328. Relative movement thus occurs between the shock absorber piston 332 on rod 340 and the surrounding member 320 that is mounted to the end of the gripper carriage 258.

As the return spring 328 moves the member 320 and gripper carriage 258 further forward, the piston 332 is prevented from moving forward because the pusher rod 340 is bearing against the end of the anvil bore 238. Thus, the shock absorber unit 324 is forced closer to the piston 332 in the bore 322. This motion is resisted and damped by the movement of the piston rod 325 within the shock absorber unit 324. (The relative movement is also resisted, but to only a small degree, by the compression spring 334 in the cylinder 322 behind the piston 332. However, the design function of the spring 334 is to normally bias the piston 332 (to the right as viewed in FIG. 21) against the nuts 316 at the end of the chamber 322). The movement of the member 320 and gripper carriage 258 terminates as illustrated in FIG. 24 when the front end of the cutter carriage 288 has engaged the front end of the slot 242 in the anvil A. The shock of this engagement is considerably reduced by the above-described action of the shock absorber unit 324.

The extension and closing of the grippers G and cutters K against the anvil A occurs very quickly under the influence of the gripper carriage return spring 328 while the shaft 142 and barrel cam 140 complete the rotation back to the original start position at zero degrees. Return of the shaft 142 and barrel cam 140 to the original start position after closure of the cutters K and grippers G against the anvil A actuates a switch (not illustrated) on the cam shaft 142 which, through an appropriate conventional control system, effects termination of the cam shaft drive means (e.g., motor) and effects termination of the movement of the strap carrier R on the chain C at the position illustrated in FIG. 7. The apparatus is then ready to begin the next strapping cycle on a new article.

The anvil, gripper and cutter assembly has been described above with reference to the illustrated embodiment of the apparatus employing the torsion bar with the novel geared strap engaging member. However, it is to be realized that the disclosed mechanisms for (1) extending and retracting the anvil, 2) opening and closing the grippers and cutters, and (3) extending and retracting the grippers and cutters independently of the anvil may all be employed in friction-fusion strapping machines wherein the strap engaging member weld pad is actuated by mechanisms other than a torsion bar system.

It will be readily observed from the foregoing detailed description of the invention and from the illustrated embodiments thereof that numerous variations and modifications may be effected without departing from the true spirit and scope of the novel concepts or principles of this invention.

What is claimed is:

1. Apparatus for securing a loop of thermoplastic strap around an article so that two overlapping portions of said strap are bonded together, said apparatus comprising:
- an anchored torsion spring means for being torsionally stressed to store a predetermined amount of energy;
- an arc of gear teeth carried by said torsion spring means for rotation with said torsion spring means about an axis of rotation;
- a strap engaging member for pressing against and gripping the outwardly directed surface of one of said overlapping strap portions, said strap engaging member defining a rack gear with a row of gear teeth;
- mounting means for mounting said strap engaging member with the gear teeth of said rack gear engaged with at least some of said teeth of said arc of gear teeth on said torsion spring means;
- an anvil defining a planar strap engaging surface against which the outwardly directed surface of the other of said overlapping strap portions is pressed;
- means for effecting relative movement between said anvil and at least said strap engaging member to compress said overlapping strap portions therebetween; and
- means for torsionally stressing and then removing the torsion stress from said torsion spring means after said predetermined amount of energy has been stored whereby said strap engaging member is oscillated on said mounting means in linear motion against the overlapping strap portions as said arc of gear teeth is rotated whereby bodily sliding frictional movement occurs between the overlapping strap portions to melt interface regions which subsequently solidify.

2. The apparatus in accordance with claim 1
- in which said strap engaging member defines a generally planar strap engaging surface for contacting said one overlapping strap portion, said strap engaging surface of said strap engaging member including a plurality of spaced-apart, parallel, raised ribs oriented to extend parallel to the lengths of said overlapping strap portions, each said rib presenting a generally planar strap contacting surface; and
- in which said mounting means includes means for mounting said strap engaging member with the planar strap contacting surfaces of each rib disposed in a plane parallel to said planar strap engaging surface of said anvil.

3. The apparatus in accordance with claim 2
- in which said apparatus is adapted to accommodate at least strap comprising linear crystallizable polypropylene that has been worked into a thin film having planar molecular orientation of the macromolecular chains with a uniplanar, axial oriented crystalline structure through at least a major portion of the film thickness;
- in which said ribs are uniformly spaced apart by about 4 mm.; and
- in which the width of each said rib planar strap contacting surface is about 2.5 mm.

4. The apparatus in accordance with claim 2 in which said apparatus is adapted to be used with thin film strap having a predetermined width and in which the sum of the widths of all of said rib planar contacting surfaces is about 32 percent of said predetermined strap width.

5. The apparatus in accordance with claim 2 in which the generally planar strap contacting surface of each said rib is defined by a plurality of pyramid shaped teeth.

6. The apparatus in accordance with claim 5
- in which the bases of said pyramid shaped teeth are of the same configuration and size; and
- in which said pyramid shaped teeth are arranged in a rank and file checkerboard-like pattern on each said rib with (1) a pair of opposite sides of the base of each tooth aligned parallel to the ranks, (2) a pair of opposite sides of the base of each tooth aligned parallel to the files, (3) the teeth in each rank and file being uniformly spaced apart by an amount equal to the length of the base of each tooth, (4) the teeth in each rank and file being staggered relative to the teeth in the adjacent ranks and files, respectively, and (5) each tooth in each rank and file each being disposed directly adjacent a space between two teeth in the adjacent rank and file, respectively.

7. The apparatus in accordance with claim 2
- in which the generally planar strap contacting surface of each said rib is defined by a plurality of pyramid shaped teeth arranged in ranks or rows with two opposite sides of the base of each tooth being disposed generally parallel to said rows; and
- in which each said row of teeth is skewed at an angle of about 10 degrees relative to the lengths of said ribs.

8. The apparatus in accordance with claim 7 in which each tooth has a height of about 0.2 mm. and a pyramid base length of about 0.4 (mm.)

9. The apparatus in accordance with claim 2 in which said anvil strap engaging surface is substantially smooth.

10. The apparatus in accordance with claim 1
- in which said torsion spring means includes a torsion bar;
- in which said strap engaging member mounting means includes a bearing member carried by said torsion bar;
- in which said strap engaging member mounting means includes a retainer rod disposed with its longitudinal axis substantially parallel to said anvil planar strap engaging surface and parallel to the paths of said overlapping strap portions adjacent said anvil; and
- in which said strap engaging member includes a support block disposed against said bearing member, said support block defining said rack gear on one side and defining a convex cylindrical arc support surface on the other side, said support surface being oriented with its associated longitudinal axis of curvature parallel to said retainer rod, said support block defining a bore extending from one end to the other end and slidably receiving said retainer rod therein; and
- in which said strap engaging member includes a strap engaging pad mounted on said support block, said engaging pad defining on one side a concave cylindrical arc surface mating with said convex cylindrical arc support surface of said support block, said engaging pad having on the other side a generally planar strap engaging surface for contacting said one overlapping strap portion and adapted to be aligned parallel to the strap engaging surface of said anvil, and said engaging pad including a flange on each end adjacent an end of said support block, each said engaging pad flange defining a bore that slidably receives said retainer rod therein.

11. Apparatus for securing a loop of thermoplastic strap around an article so that two overlapping portions of said strap are bonded together, said apparatus comprising:

a frame;

a torsion bar anchored on one end to said frame;

a pinion gear carried by said torsion bar for rotation with said torsion bar about the longitudinal axis of said torsion bar;

a strap engaging member for pressing against and gripping the outwardly directed surface of one of said overlapping strap portions, said strap engaging member defining a rack gear with a row of gear teeth;

mounting means for mounting said strap engaging member with the teeth of said rack gear engaged with at least some of the teeth of said pinion gear on said torsion bar;

an anvil defining a planar strap engaging surface against which the outwardly directed surface of the other of said overlapping strap portions is pressed;

means for effecting relative movement between said anvil and at least said strap engaging member to compress said overlapping strap portions therebetween; and means for torsionally stressing said torsion bar to store a predetermined amount of energy and then removing the torsion stress from said torsion bar after said predetermined amount of energy has been stored whereby said strap engaging member is oscillated on said mounting means in linear motion against the overlapping strap portions as said pinion gear is rotated whereby bodily sliding frictional movement occurs between the overlapping strap portions to melt interface regions which subsequently solidify.

12. The apparatus in accordance with claim 11 in which said torsion bar, pinion gear, strap engaging member, and mounting means are carried by at least one carriage;

in which said apparatus includes reciprocating means for reciprocating said carriage between an extended position where said strap engaging member is in registry with said one overlapping strap portion and a retracted position spaced away from said one overlapping strap portion; and in which said apparatus includes pivoting means for pivoting said carriage between an elevated position where said strap engaging member is pressed against said one overlapping strap portion and a lowered position spaced away from said one overlapping strap portion.

13. The apparatus in accordance with claim 11 further including (1) means for reciprocating said anvil between an extended position adjacent said overlapping strap portions and a retracted position spaced away from said overlapping strap portions;

(2) gripping means for holding said other overlapping strap portion against said anvil; and (3) means for cutting said one overlapping strap portion from the portion of the strap trailing from said loop.

14. A method for securing a loop of thermoplastic strap around an article so that two overlapping portions of said strap are bonded together, said method comprising the steps of:

storing a predetermined amount of energy in an anchored oscillatable torsion spring system;

compressing said overlapping strap portions between a strap engaging member that grips the outwardly directed surface of one of said overlapping strap portions and an anvil that contacts the outwardly directed surface of the other of said overlapping strap portions;

releasing the stored energy of said oscillatable torsion spring system in the form of the kinetic energy of torsional oscillations in said spring system; and utilizing said torsional oscillation kinetic energy to oscillate said strap engaging member along a linear path of motion adjacent said anvil to cause bodily sliding friction movement between the overlapping strap portions to melt interface regions which subsequently solidify.

15. The method in accordance with claim 14 wherein said step of storing energy includes stressing a torsion bar.

16. The method in accordance with claim 14 wherein said step of utilizing said torsional oscillation kinetic energy includes translating rotational motion of said torsional oscillations into reciprocating linear motion with a rack and pinion assembly.

17. Apparatus for securing a loop of thermoplastic strap around an article so that two overlapping portions of said strap are bonded together by means of a friction-fusion weld, said apparatus being able to effect an acceptable friction-fusion weld in at least thin film strap, said apparatus comprising:

a strap engaging member for pressing against and gripping the outwardly directed surface of one of said overlapping strap portions, said strap engaging member defining a plurality of spaced-apart, raised ribs extending parallel to the lengths of the overlapping strap portions, each said rib presenting a generally planar strap contacting surface;

an anvil against which the outwardly directed surface of the other of said overlapping strap portions is pressed;

means for effecting relative movement between said anvil and at least said strap engaging member to compress said overlapping strap portions therebetween; and means for moving said strap engaging member along a path of motion parallel to the lengths of said ribs to cause bodily sliding frictional movement between the overlapping strap portions to melt interface regions which subsequently solidify.

18. The apparatus in accordance with claim 17 in which said ribs are uniformly spaced apart by about 4 mm.; and in which the width of each said rib planar strap contacting surface is about 2.5 mm.

19. The apparatus in accordance with claim 17 in which said apparatus is adapted to be used with at least strap comprising linear crystallizable polypropylene that has been worked into a thin film having planar molecular orientation of the macromolecular chains with a uniplanar, axial oriented crystalline structure through at least a major portion of the film thickness and having a predetermined width; and in which the sum of the widths of all of said rib planar contacting surfaces is between about 30 and 40 percent of said predetermined strap width.

20. The apparatus in accordance with claim 17
in which the generally planar strap contacting surface of each said rib is defined by a plurality of pyramid shaped teeth arranged in ranks or rows with two opposite sides of the base of each tooth being disposed generally parallel to said rows; and
in which each said row of pyramid shaped teeth is skewed at an angle of about 10 degrees relative to the lengths of said ribs.

21. The apparatus in accordance with claim 17 in which said anvil has a substantially smooth strap engaging surface.

22. A method for securing a loop of thermoplastic strap around an article so that two overlapping portions of said strap are bonded together by means of a friction-fusion weld, said method producing an acceptable friction-fusion weld in at least thin film strap, said method comprising the steps of:
providing an anvil and a strap engaging member wherein the strap engaging member defines a plurality of spaced-apart, raised ribs extending parallel to the lengths of the overlapping strap portions, each said rib presenting a generally planar strap contacting surface;
compressing said overlapping strap portions between (1) said strap engaging member while it is in gripping engagement with the outwardly directed surface of one of said overlapping strap portions and (2) said anvil while it is in contact with the outwardly directed surface of the other of said overlapping strap portions; and
moving said strap engaging member along a linear path of motion adjacent said anvil generally parallel to the lengths of said ribs to cause bodily sliding frictional movement between the overlapping strap portions to melt interface regions which subsequently solidify.

23. The method in accordance with claim 22
in which said method is especially adapted for use with at least strap comprising linear crystallizable polypropylene that has been worked into a thin film having planar molecular orientation of the macromolecular chains with a uniplanar, axial oriented crystalline structure through at least a major portion of the film thickness;
in which said step of providing a strap engaging member includes providing on the generally planar strap contacting surface of each said rib a plurality of pyramid shaped teeth each having a height of about 0.2 mm. and a base length of about 0.4 mm.;
in which said step of compressing said overlapping strap portions includes urging said rib teeth into the surface of said one overlapping strap portion to a depth of about 0.075 mm.; and
in which said step of moving said strap engaging member along a linear path includes reciprocating said strap engaging member for at least about 17 milliseconds at about 200 Hertz with at least an initial maximum stroke length of about 9 mm.

* * * * *